(12) United States Patent
Konishi et al.

(10) Patent No.: US 9,170,741 B2
(45) Date of Patent: Oct. 27, 2015

(54) INFORMATION PROCESSING SYSTEM AND CONTROL METHOD FOR INFORMATION PROCESSING SYSTEM

(71) Applicant: FUJITSU LIMITED, Kawasaki-shi, Kanagawa (JP)

(72) Inventors: Yotaro Konishi, Yokohama (JP); Noboru Iwamatsu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/504,515

(22) Filed: Oct. 2, 2014

(65) Prior Publication Data

US 2015/0103429 A1 Apr. 16, 2015

(51) Int. Cl.
*G11B 19/20* (2006.01)
*G06F 3/06* (2006.01)
*G11B 5/86* (2006.01)

(52) U.S. Cl.
CPC ............ *G06F 3/0611* (2013.01); *G06F 3/0653* (2013.01); *G06F 3/0689* (2013.01); *G11B 5/86* (2013.01); *G11B 19/209* (2013.01)

(58) Field of Classification Search
None
See application file for complete search history.

(56) References Cited

U.S. PATENT DOCUMENTS

| | | | |
|---|---|---|---|
| 7,206,991 B2 * | 4/2007 | Chatterjee et al. | 714/770 |
| 7,469,315 B2 * | 12/2008 | Watanabe et al. | 711/114 |
| 7,653,781 B2 * | 1/2010 | Dawkins | 711/114 |
| 7,809,884 B1 * | 10/2010 | Linnell | 711/114 |
| 7,836,251 B2 * | 11/2010 | Watanabe et al. | 711/114 |
| 7,996,612 B2 * | 8/2011 | Ukai et al. | 711/114 |
| 8,009,501 B2 * | 8/2011 | Sugiki et al. | 711/114 |
| 8,024,585 B2 * | 9/2011 | Yasui et al. | 713/300 |
| 8,041,914 B2 * | 10/2011 | Fukatani et al. | 711/165 |
| 8,140,754 B2 * | 3/2012 | Kaneda | 711/117 |
| 8,140,793 B2 * | 3/2012 | Nonaka et al. | 711/162 |
| 8,312,313 B2 * | 11/2012 | Kitora | 714/5.11 |
| 8,447,997 B2 * | 5/2013 | Yasui et al. | 713/300 |
| 8,549,528 B2 * | 10/2013 | Nakajima et al. | 718/104 |
| 8,910,174 B2 * | 12/2014 | Nakajima et al. | 718/104 |
| 2007/0208921 A1 * | 9/2007 | Hosouchi et al. | 711/170 |
| 2009/0055520 A1 | 2/2009 | Tabata et al. | |
| 2009/0249003 A1 * | 10/2009 | Bates et al. | 711/162 |
| 2010/0058090 A1 * | 3/2010 | Taki et al. | 713/324 |

FOREIGN PATENT DOCUMENTS

| | | |
|---|---|---|
| JP | 2002-297320 | 10/2002 |
| JP | 2009-48583 | 3/2009 |

* cited by examiner

*Primary Examiner* — Wayne Young
*Assistant Examiner* — James L Habermehl
(74) *Attorney, Agent, or Firm* — Staas & Halsey LLP

(57) ABSTRACT

An information processing system includes a first information processing apparatus coupled to a first magnetic-disk-device groups including first magnetic disk devices whose motors rotate, a second information processing apparatus coupled to a second magnetic-disk-device group including one or more second magnetic disk devices whose motors rotate and a plurality of third magnetic disk devices whose motors are in a stop state. A management apparatus which included in the system is configured to manage the first and second information processing apparatuses, wherein, when data is to be written, the management apparatus outputs a write request to any of the plurality of first magnetic disk devices and any of the one or more second magnetic disk devices, and when data is to be read, the management apparatus outputs a read request to any of the plurality of first magnetic disk devices.

10 Claims, 29 Drawing Sheets

FIG. 8

DTBL

| | DEVICE ID | STATE | IDENTIFIER | MOUNT POINT | IP ADDRESS |
|---|---|---|---|---|---|
| MDp | devP0 | | | /mnt/devP0 | 192.168.1.1 |
| | devP1 | | | /mnt/devP1 | 192.168.1.1 |
| | devP2 | | | /mnt/devP2 | 192.168.1.1 |
| | ⋮ | | | ⋮ | ⋮ |
| | devP15 | | | /mnt/devP15 | 192.168.1.1 |
| MDa | devHa0 | ST0 | a0 | /mnt/devA0 | 192.168.1.2 |
| | | ST1 | e0 | /mnt/devA4 | 192.168.1.2 |
| | | ST2 | i0 | /mnt/devA8 | 192.168.1.2 |
| | devHa1 | ST0 | b0 | /mnt/devA1 | 192.168.1.2 |
| | | ST1 | f0 | /mnt/devA5 | 192.168.1.2 |
| | | ST2 | j0 | /mnt/devA9 | 192.168.1.2 |
| | devHa2 | ST0 | c0 | /mnt/devA2 | 192.168.1.2 |
| | | ST1 | g0 | /mnt/devA6 | 192.168.1.2 |
| | | ST2 | k0 | /mnt/devA10 | 192.168.1.2 |
| | devHa3 | ST0 | d0 | /mnt/devA3 | 192.168.1.2 |
| | | ST1 | h0 | /mnt/devA7 | 192.168.1.2 |
| | | ST2 | l0 | /mnt/devA11 | 192.168.1.2 |
| MDb | devHb0 | ST0 | a1 | /mnt/devB0 | 192.168.1.3 |
| | | ST1 | e1 | /mnt/devB4 | 192.168.1.3 |
| | | ST2 | i1 | /mnt/devB8 | 192.168.1.3 |
| | ⋮ | ⋮ | ⋮ | ⋮ | ⋮ |
| | devHb3 | ST0 | d1 | /mnt/devB3 | 192.168.1.3 |
| | | ST1 | h1 | /mnt/devB7 | 192.168.1.3 |
| | | ST2 | l1 | /mnt/devB11 | 192.168.1.3 |
| MDc | devHc0 | ST0 | a2 | /mnt/devC0 | 192.168.1.4 |
| | | ST1 | e2 | /mnt/devC4 | 192.168.1.4 |
| | | ST2 | i2 | /mnt/devC8 | 192.168.1.4 |
| | ⋮ | ⋮ | ⋮ | ⋮ | ⋮ |
| | devHc3 | ST0 | d2 | /mnt/devC3 | 192.168.1.4 |
| | | ST1 | h2 | /mnt/devC7 | 192.168.1.4 |
| | | ST2 | l2 | /mnt/devC11 | 192.168.1.4 |

FIG. 9

HTBL

| TOP BITS OF HASH VALUE | DEVICE ID | | | |
|---|---|---|---|---|
| | MDp | MDa | MDb | MDc |
| 0h (0000b) | devP0 | devHa0 | devHb0 | devHc0 |
| 1h (0001b) | devP3 | | | |
| 2h (0010b) | devP4 | | | |
| 3h (0011b) | devP9 | | | |
| 4h (0100b) | devP13 | devHa3 | devHb3 | devHc3 |
| 5h (0101b) | devP8 | | | |
| 6h (0110b) | devP11 | | | |
| 7h (0111b) | devP2 | | | |
| 8h (1000b) | devP15 | devHa1 | devHb1 | devHc1 |
| 9h (1001b) | devP5 | | | |
| Ah (1010b) | devP1 | | | |
| Bh (1011b) | devP14 | | | |
| Ch (1100b) | devP12 | devHa2 | devHb2 | devHc2 |
| Dh (1101b) | devP10 | | | |
| Eh (1110b) | devP7 | | | |
| Fh (1111b) | devP6 | | | |

FIG. 20

DTBL

| | DEVICE ID | STATE | IDENTIFIER | MOUNT POINT | IP ADDRESS | |
|---|---|---|---|---|---|---|
| MDp | devP0 | | | /mnt/devP0 | 192.168.1.1 | |
| | devP1 | | | /mnt/devP1 | 192.168.1.1 | |
| | devP2 | | | /mnt/devP2 | 192.168.1.1 | |
| | ⋮ | | | ⋮ | ⋮ | |
| | devP15 | | | /mnt/devP15 | 192.168.1.1 | |
| MDa | devHa0 | ST0 | a0 | /mnt/devA0 | 192.168.1.2 | |
| | | ST1 | e0 | /mnt/devA4 | 192.168.1.2 | |
| | | ST2 | i0 | /mnt/devA8 | 192.168.1.2 | |
| | | ST3 | m0 | /mnt/devA12 | 192.168.1.2 | ⇐ ADDED |
| | devHa1 | ST0 | b0 | /mnt/devA1 | 192.168.1.2 | |
| | | ST1 | f0 | /mnt/devA5 | 192.168.1.2 | |
| | | ST2 | j0 | /mnt/devA9 | 192.168.1.2 | |
| | | ST3 | n0 | /mnt/devA13 | 192.168.1.2 | ⇐ ADDED |
| | devHa2 | ST0 | c0 | /mnt/devA2 | 192.168.1.2 | |
| | | ST1 | g0 | /mnt/devA6 | 192.168.1.2 | |
| | | ST2 | k0 | /mnt/devA10 | 192.168.1.2 | |
| | | ST3 | o0 | /mnt/devA14 | 192.168.1.2 | ⇐ ADDED |
| | devHa3 | ST0 | d0 | /mnt/devA3 | 192.168.1.2 | |
| | | ST1 | h0 | /mnt/devA7 | 192.168.1.2 | |
| | | ST2 | l0 | /mnt/devA11 | 192.168.1.2 | |
| | | ST3 | p0 | /mnt/devA15 | 192.168.1.2 | ⇐ ADDED |
| MDb | ⋮ | ⋮ | ⋮ | ⋮ | ⋮ | |
| MDc | devHc0 | ST0 | a2 | /mnt/devC0 | 192.168.1.4 | |
| | | ST1 | e2 | /mnt/devC4 | 192.168.1.4 | |
| | | ST2 | i2 | /mnt/devC8 | 192.168.1.4 | |
| | | ST3 | m2 | /mnt/devC12 | 192.168.1.4 | ⇐ ADDED |
| | ⋮ | ⋮ | ⋮ | ⋮ | ⋮ | |
| | devHc | ST0 | d2 | /mnt/devC3 | 192.168.1.4 | |
| | | ST1 | h2 | /mnt/devC7 | 192.168.1.4 | |
| | | ST2 | l2 | /mnt/devC11 | 192.168.1.4 | |
| | | ST3 | p2 | /mnt/devC15 | 192.168.1.4 | ⇐ ADDED |

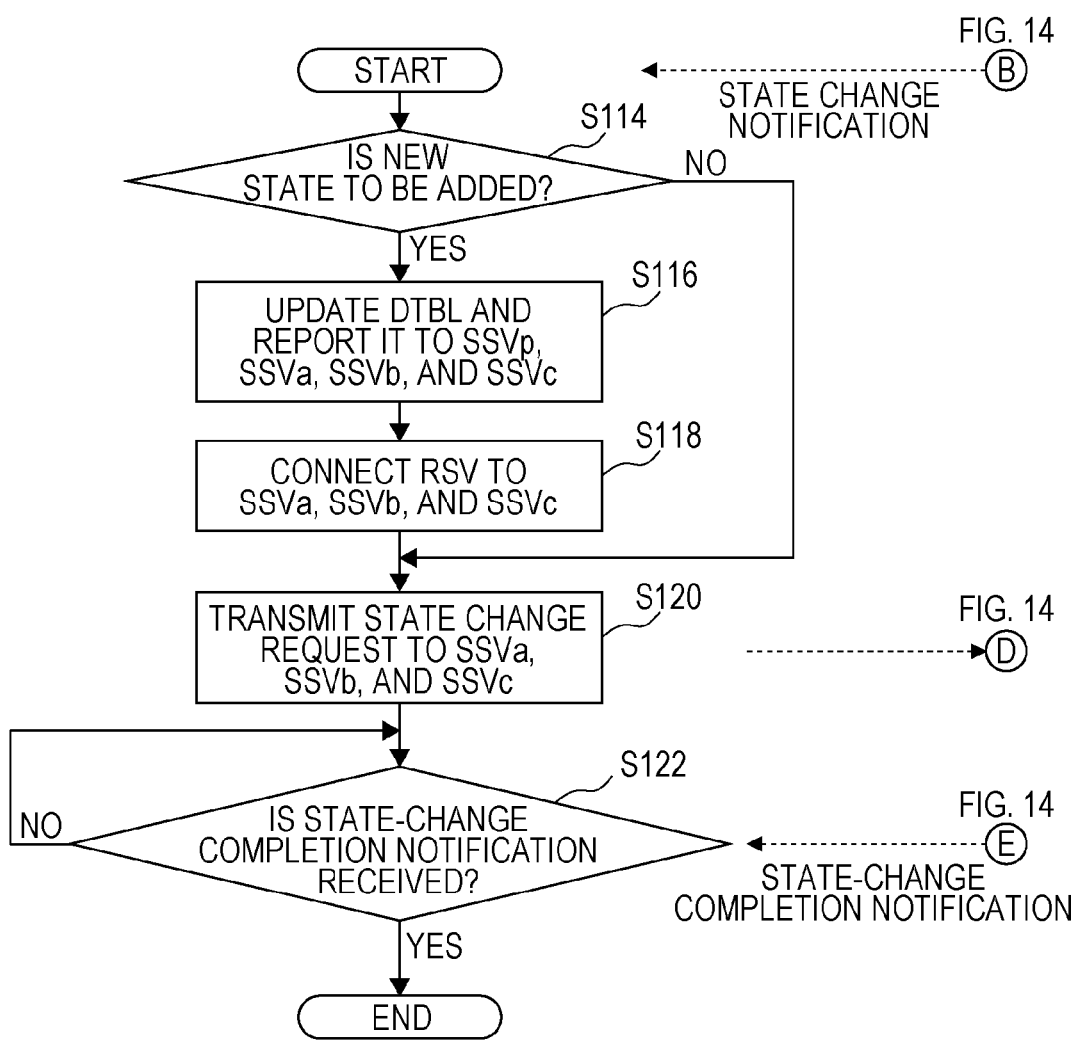

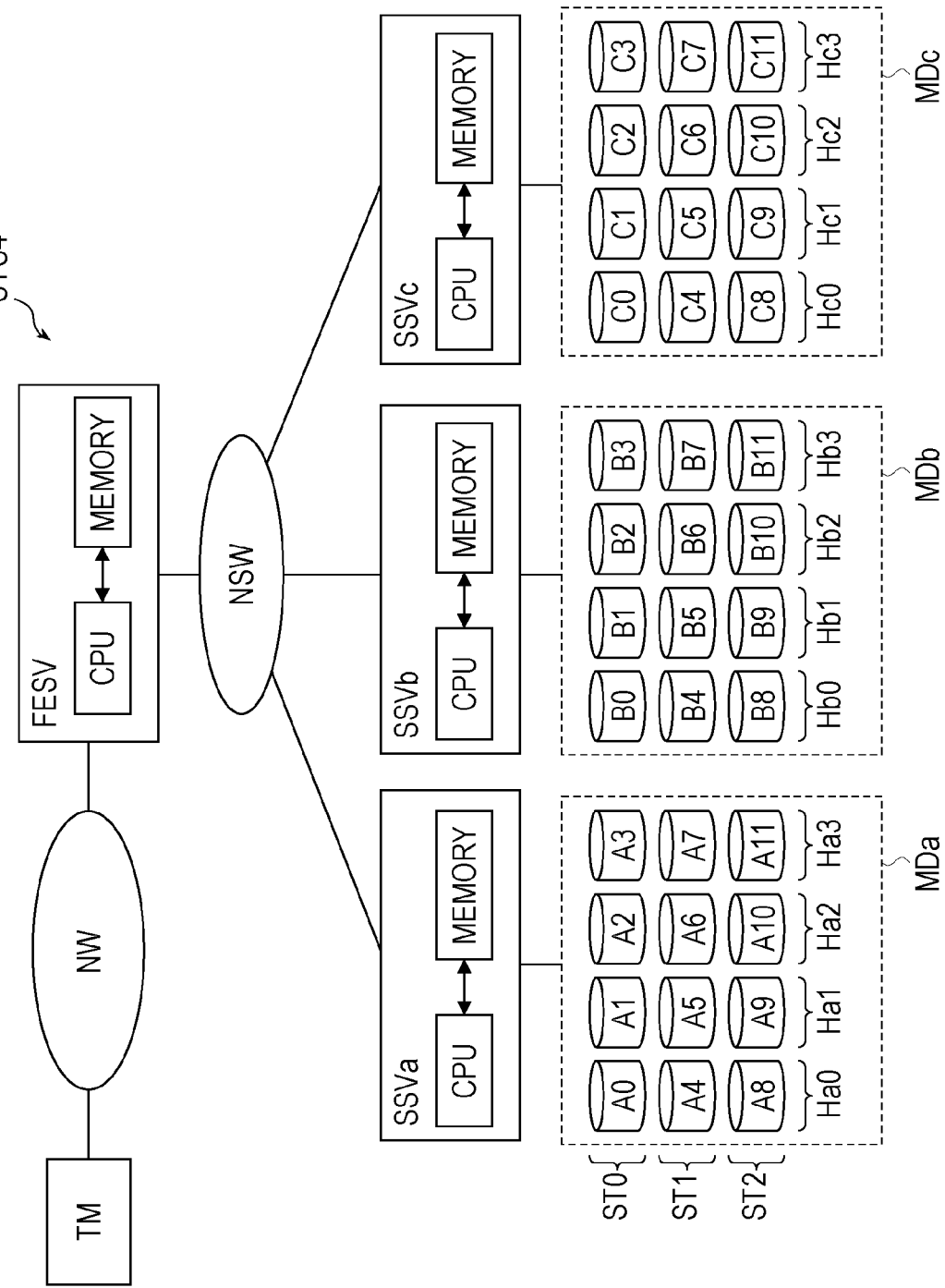

FIG. 25

DTBL

| | DEVICE ID | STATE | IDENTIFIER | MOUNT POINT | IP ADDRESS |
|---|---|---|---|---|---|
| PZ { | devP00 | / | / | /mnt/devP00 | 192.168.1.1 |
| | devP01 | / | / | /mnt/devP01 | 192.168.1.1 |
| | devP02 | / | / | /mnt/devP02 | 192.168.1.1 |
| | ⋮ | / | / | ⋮ | ⋮ |
| | devP29 | / | / | /mnt/devP29 | 192.168.1.1 |
| | devP30 | / | / | /mnt/devP30 | 192.168.1.1 |
| | devP31 | / | / | /mnt/devP31 | 192.168.1.1 |
| AZ { | devHa0 | ST0 | a0 | /mnt/devA0 | 192.168.1.2 |
| | | ST1 | e0 | /mnt/devA4 | 192.168.1.2 |
| | | ST2 | i0 | /mnt/devA8 | 192.168.1.2 |
| | ⋮ | ⋮ | ⋮ | ⋮ | ⋮ |
| | devHa3 | ST0 | d0 | /mnt/devA3 | 192.168.1.2 |
| | | ST1 | h0 | /mnt/devA7 | 192.168.1.2 |
| | | ST2 | l0 | /mnt/devA11 | 192.168.1.2 |
| BZ { | devHb0 | ST0 | a1 | /mnt/devB0 | 192.168.1.3 |
| | | ST1 | e1 | /mnt/devB4 | 192.168.1.3 |
| | | ST2 | i1 | /mnt/devB8 | 192.168.1.3 |
| | ⋮ | ⋮ | ⋮ | ⋮ | ⋮ |
| | devHb3 | ST0 | d1 | /mnt/devB3 | 192.168.1.3 |
| | | ST1 | h1 | /mnt/devB7 | 192.168.1.3 |
| | | ST2 | l1 | /mnt/devB11 | 192.168.1.3 |
| CZ { | devHc0 | ST0 | a2 | /mnt/devC0 | 192.168.1.4 |
| | | ST1 | e2 | /mnt/devC4 | 192.168.1.4 |
| | | ST2 | i2 | /mnt/devC8 | 192.168.1.4 |
| | ⋮ | ⋮ | ⋮ | ⋮ | ⋮ |
| | devHc3 | ST0 | d2 | /mnt/devC3 | 192.168.1.4 |
| | | ST1 | h2 | /mnt/devC7 | 192.168.1.4 |
| | | ST2 | l2 | /mnt/devC11 | 192.168.1.4 |

FIG. 26

HTBL

| TOP BITS OF HASH VALUE | DEVICE ID | | | | |
|---|---|---|---|---|---|
| | MDp | | MDa | MDb | MDc |
| | MDp1 | MDp2 | | | |
| 00h (00000b) | devP0 | devP6 | devHa0 | devHb0 | devHc0 |
| 01h (00001b) | devP16 | devP22 | | | |
| 02h (00010b) | devP3 | devP7 | | | |
| 03h (00011b) | devP19 | devP23 | | | |
| 04h (00100b) | devP4 | devP10 | | | |
| 05h (00101b) | devP20 | devP26 | | | |
| 06h (00110b) | devP9 | devP12 | | | |
| 07h (00111b) | devP25 | devP28 | | | |
| 08h (01000b) | devP13 | devP14 | devHa3 | devHb3 | devHc3 |
| 09h (01001b) | devP29 | devP30 | | | |
| 0Ah (01010b) | devP8 | devP1 | | | |
| 0Bh (01011b) | devP24 | devP17 | | | |
| 0Ch (01100b) | devP11 | devP5 | | | |
| 0Dh (01101b) | devP27 | devP21 | | | |
| 0Eh (01110b) | devP2 | devP15 | | | |
| 0Fh (01111b) | devP18 | devP31 | | | |
| 10h (10000b) | devP15 | devP2 | devHa1 | devHb1 | devHc1 |
| 11h (10001b) | devP31 | devP18 | | | |
| 12h (10010b) | devP5 | devP11 | | | |
| 13h (10011b) | devP21 | devP27 | | | |
| 14h (10100b) | devP1 | devP8 | | | |
| 15h (10101b) | devP17 | devP24 | | | |
| 16h (10110b) | devP14 | devP13 | | | |
| 17h (10111b) | devP30 | devP29 | | | |
| 18h (11000b) | devP12 | devP9 | devHa2 | devHb2 | devHc2 |
| 19h (11001b) | devP28 | devP25 | | | |
| 1Ah (11010b) | devP10 | devP4 | | | |
| 1Bh (11011b) | devP26 | devP20 | | | |
| 1Ch (11100b) | devP7 | devP3 | | | |
| 1Dh (11101b) | devP23 | devP19 | | | |
| 1Eh (11110b) | devP6 | devP0 | | | |
| 1Fh (11111b) | devP22 | devP16 | | | |

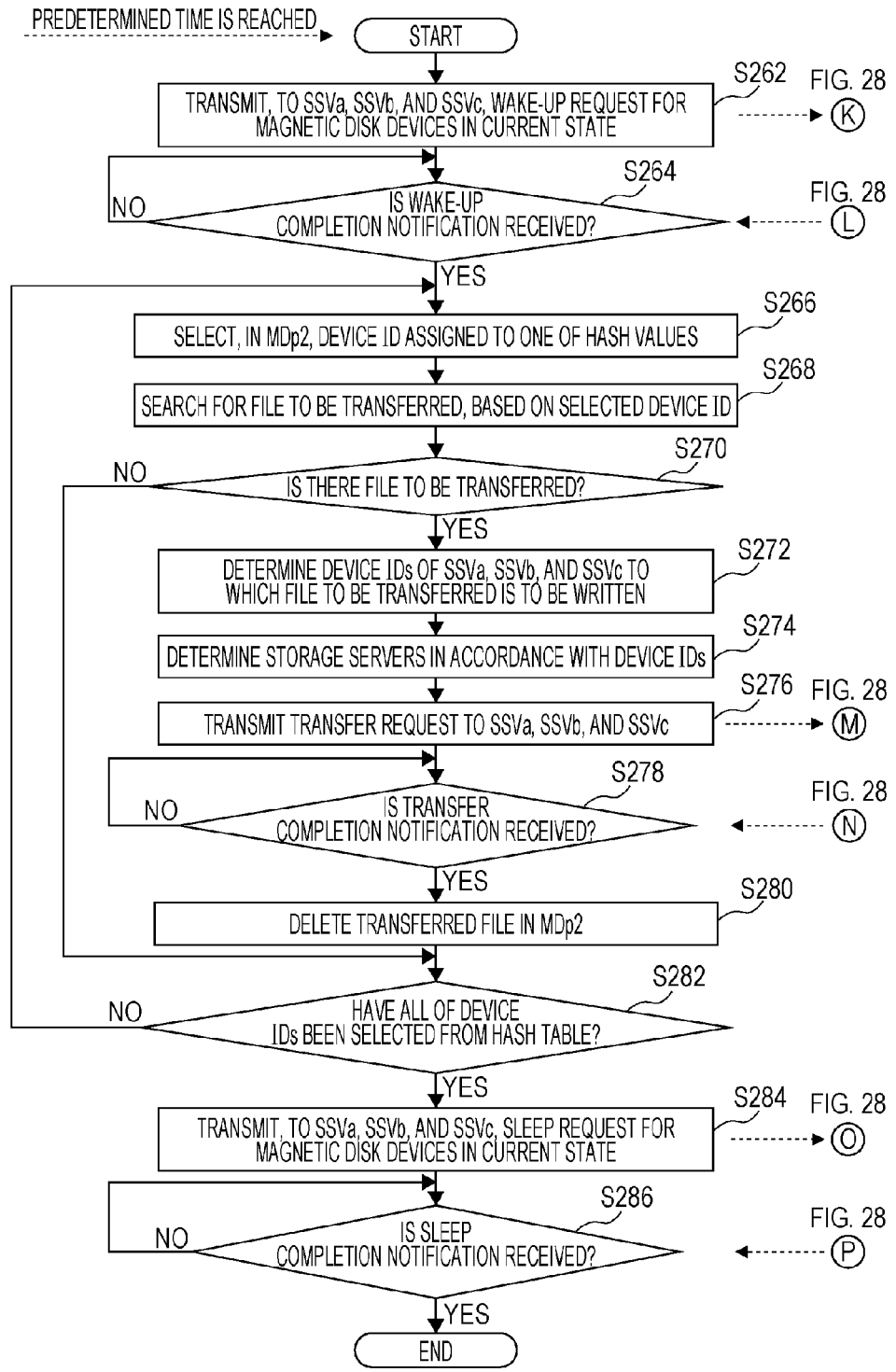

INFORMATION PROCESSING SYSTEM AND CONTROL METHOD FOR INFORMATION PROCESSING SYSTEM

CROSS-REFERENCE TO RELATED APPLICATION

This application is based upon and claims the benefit of priority of the prior Japanese Patent Application No. 2013-213995 filed on Oct. 11, 2013, the entire contents of which are incorporated herein by reference.

FIELD

The embodiments discussed herein are related to an information processing system and a control method for the information processing system.

BACKGROUND

For example, for a disk array device including a plurality of hard-disk drives, write data is divided and written to the plurality of hard-disk drives, and data read from the hard-disk drives are combined together and output as data to be read. In such a disk array device, when the frequency of accesses becomes lower than a threshold, power supply to one or some of hard-disk drives is stopped, and data is written to the hard-disk drives for which the power supply is maintained, without being divided (for example, see Japanese Laid-open Patent Publication No. 2002-297320).

There is also a proposed scheme for reducing the power consumption by controlling execution of a task and power supply of a storage device based on, of schedule plans for executing tasks using a storage device, a schedule plan that satisfies a predetermined condition (for example, see Japanese Laid-open Patent Publication No. 2009-48583).

SUMMARY

According to an aspect of the invention, an information processing system includes a first information processing apparatus to which a first magnetic-disk-device group is coupled, the first magnetic-disk-device group including a plurality of first magnetic disk devices, a motor in each of the plurality of first magnetic disk drives being maintained in a state of rotation; a second information processing apparatus to which a second magnetic-disk-device group is coupled, the second magnetic-disk-device group including one or more second magnetic disk devices and a plurality of third magnetic disk devices, a motor in each of the one or more second magnetic disk devices being maintained in a rotation state, a motor in each of the plurality of third magnetic disk devices being maintained in a stop state; and a management apparatus configured to manage the first information processing apparatus and the second information processing apparatus, wherein, when data is to be written, the management apparatus outputs a write request to any of the plurality of first magnetic disk devices and any of the one or more second magnetic disk devices, and when data is to be read, the management apparatus outputs a read request to any of the plurality of first magnetic disk devices.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 illustrates an example of a device table indicating associations of the magnetic disk devices coupled to the storage servers illustrated in FIG. 4;

FIG. 9 illustrates an example of a hash table indicating relationships between hash values and the magnetic disk devices in the magnetic-disk-device groups illustrated in FIG. 4;

FIG. 20 illustrates an example of the device table to which information including state ST3 illustrated in FIG. 19 has been added;

FIG. 21 illustrates an example of processing, executed by the front-end server illustrated in FIG. 18, for changing the state from state ST2 to state ST3;

FIG. 22 illustrates another embodiment of the information processing system, the control program for the management apparatus, and the control method for the information processing system;

FIG. 25 illustrates an example of a device table indicating associations of the magnetic disk devices coupled to the storage servers illustrated in FIG. 24;

FIG. 26 illustrates an example of a hash table indicating relationships between hash values and the magnetic disk devices in the magnetic-disk-device groups illustrated in FIG. 24;

FIG. 27 illustrates an example of data transfer processing executed by one of the storage servers illustrated in FIG. 24;

DESCRIPTION OF EMBODIMENTS

When the power supply of a conventional disk device is shut down to reduce the power consumption, access to the disk device for which the power supply is shut down is executed after the power supply is resumed. Thus, there is a possibility that the access performance declines. For example, a scheme for reducing the power consumption while suppressing a decline in the access performance has not been proposed for an information processing system in which data is redundantly stored in a plurality of disk devices.

Accordingly there is desired an information processing system, a control program for a management apparatus, and a control method for the information processing system that are suitable to reduce the power consumption while suppressing a decline in the access performance.

Embodiments will be described below with reference to the accompanying drawings.

Figure 1:
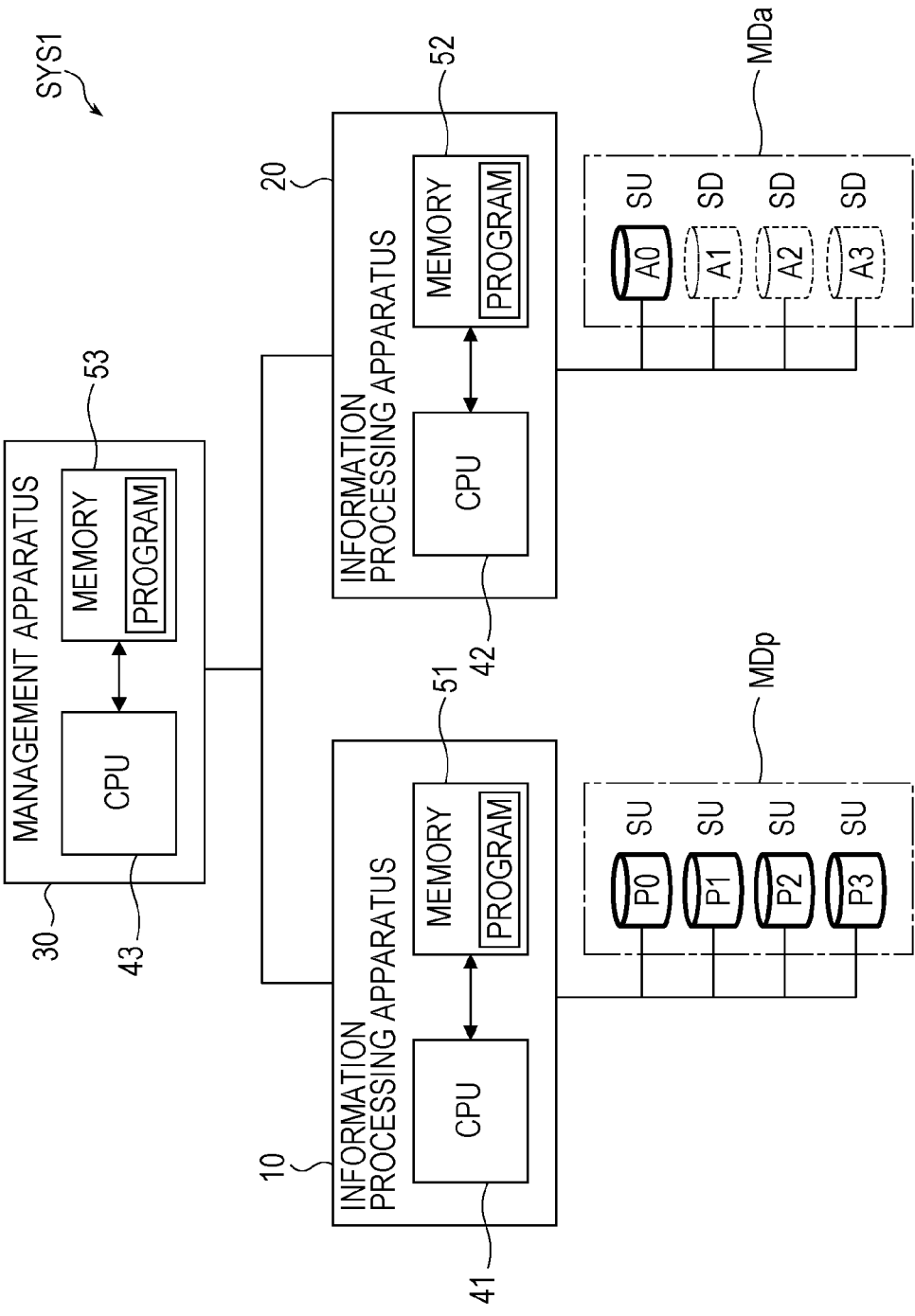
FIG. 1 illustrates an embodiment of an information processing system, a control program for a management apparatus, and a control method for an information processing system.

FIG. 1 illustrates an embodiment of an information processing system, a control program for a management apparatus, and a control method for an information processing system. An information processing system SYS1 according to this embodiment includes information processing apparatuses 10 and 20, a magnetic-disk-device group MDp coupled to the information processing apparatus 10, a magnetic-disk-device group MDa coupled to the information processing apparatus 20, and a management apparatus 30 that manages the information processing apparatuses 10 and 20.

For example, the information processing apparatuses 10 and 20 and the management apparatus 30 are computer apparatuses, such as servers. The information processing apparatus 10 includes a central processing unit (CPU) 41 and a memory 51 that stores therein a program executed by the CPU 41. The information processing apparatus 20 includes a CPU 42 and a memory 52 that stores therein a program executed by the CPU 42. The management apparatus 30 includes a CPU 43 and a memory 53 that stores therein a program executed by the CPU 43.

The program stored in the memory 53 and executed by the CPU 43 is a control program for the management apparatus 30 that manages the information processing apparatuses 10 and 20 and that controls operations of the information processing system SYS1. The program stored in the memory 53 and executed by the CPU 43 also realizes a control method for the information processing system SYS1.

The magnetic-disk-device group MDp includes magnetic disk devices P (P0, P1, P2, and P3) coupled to the information processing apparatus 10. The magnetic-disk-device group MDa includes magnetic disk devices A (A0, A1, A2, and A3) coupled to the information processing apparatus 20. For example, the magnetic disk devices P0 to P3 and A0 to A3 are hard-disk drive devices. For example, the magnetic disk devices P0 to P3 in the magnetic-disk-device group MDp are accommodated in one housing, and the magnetic disk devices A0 to A3 in the magnetic-disk-device group MDa are accommodated in one housing.

The magnetic disk devices P0, P1, P2, and P3 and the magnetic disk device A0 denoted by thick solid lines indicate that they are in a spin-up state SU in which rotation states of spindle motors for rotating corresponding magnetic disks (which may also be referred to as a "platters") are maintained. The magnetic disk devices A1, A2, and A3 denoted by thin dashed lines indicate that they are in a spin-down state SD in which rotation of the spindle motors is stopped. The information processing apparatus 20 may also include a plurality of magnetic disk devices in which the rotation states of spindle motors are maintained. In the following description, the spindle motors may also be referred to as "motors".

In a normal state, the magnetic-disk-device group MDp serves as a primary storage region on which data writing is executed in response to a write request and on which data reading is executed in response to a read request. In the normal state, the magnetic-disk-device group MDa serves as a non-primary storage region on which data writing is executed in response to a write request and on which data reading in response to a read request is not executed. In other words, the information processing apparatus 10 and the magnetic-disk-device group MDp operate as a primary storage server, and the information processing apparatus 20 and the magnetic-disk-device group MDa operate as a non-primary storage server.

Figure 2:
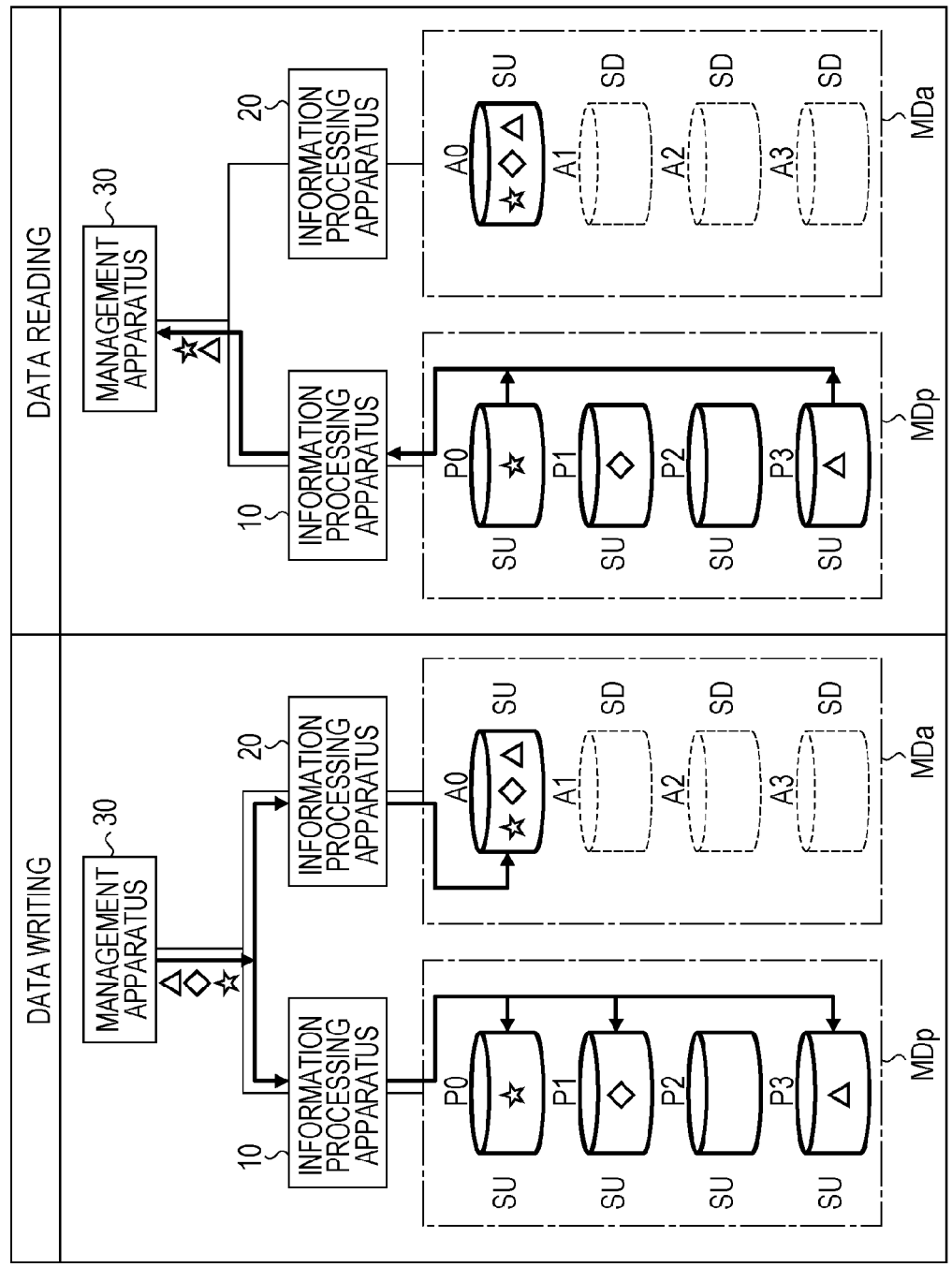
FIG. 2 illustrates an example of operations of the information processing system illustrated in FIG. 1.

FIG. 2 illustrates an example of operations of the information processing system SYS1 illustrated in FIG. 1. More specifically, FIG. 2 illustrates an example of processing of the control program executed by the management apparatus 30 and also illustrates an example of the control method for the information processing system SYS1. Thick arrows illustrated in FIG. 2 represent flows of write data and read data, and stars, rhombi, and triangles denote data that are written to the magnetic-disk-device groups MDp and MDa and are read from the magnetic-disk-device groups MDp and MDa. For clarity of description, it is assumed that each of the magnetic disk devices P0 to P3 and A0 to A3 is capable of storing four pieces of data.

For example, the management apparatus 30 issues a data write request to each of the information processing apparatuses 10 and 20. Upon receiving the write request, the information processing apparatus 10 accesses any of the magnetic disk devices P0 to P3 to write data thereto. Upon receiving the write request, the information processing apparatus 20 accesses the magnetic disk device A0 in the spin-up state SU to write data thereto. That is, when data is to be written, the management apparatus 30 outputs a write request to any of the magnetic disk devices P0 to P3 and any of the magnetic disk devices A0 to A3 (in this example, A0).

In this example, in response to an initial write request from the management apparatus 30, the data denoted by the star is written to the magnetic disk device P0 and the magnetic disk device A0. In response to a next write request from the management apparatus 30, the data denoted by the rhombus is written to the magnetic disk device P1 and the magnetic disk device A0. In response to a next write request from the management apparatus 30, the data denoted by the triangle is written to the magnetic disk device P3 and the magnetic disk device A0. In such a manner, data is redundantly written to the magnetic-disk-device groups MDp and MDa, and, for example, the data (denoted by the stars) that have been written to the magnetic disk devices P0 and A0 are replicas of each other.

For example, the management apparatus 30 inputs an identifier, such as a path name or a file name of data, for identifying data to a hash function, and determines the magnetic disk device (any of P0 to P3) to which the data is to be written, in accordance with a hash value obtained from the hash function. When the information processing apparatus 20 includes a plurality of magnetic disk devices in which the rotation states of the motors are maintained, the management apparatus 30 uses the hash function to determine a magnetic disk device to which data is to be written.

The management apparatus 30 issues a data read request to the information processing apparatus 10, but does not issue a data read request to the information processing apparatus 20. Upon receiving the data read request, the information processing apparatus 10 makes read access to any of the magnetic disk devices P0 to P3 in which data for which the data read request was received is held, to read the data. That is, the management apparatus 30 outputs a read request to any of the magnetic disk devices P0 to P3.

In this example, in response to an initial read request from the management apparatus 30, the data denoted by the star is read from the magnetic disk device P0. In response to a next read request from the management apparatus 30, the data denoted by the triangle is read from the magnetic disk device P3.

Figure 3:
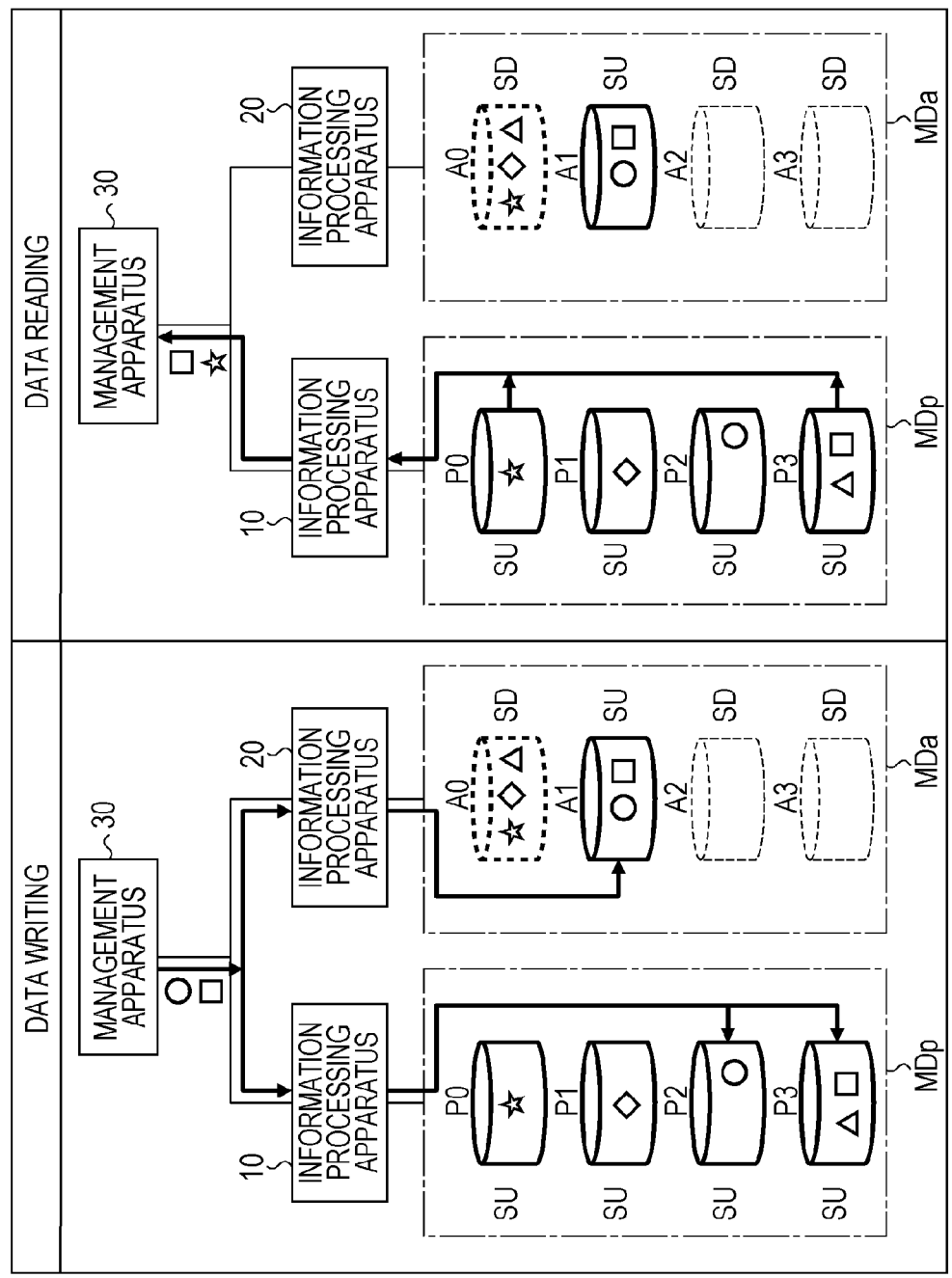
FIG. 3 illustrates another example of operations of the information processing system illustrated in FIG. 1.

FIG. 3 illustrates another example of operations of the information processing system illustrated in FIG. 1. Detailed descriptions of operations that are the same as or similar to those illustrated in FIG. 2 are not given hereinafter. FIG. 3 illustrates a continuation of the operations illustrated in FIG. 2. That is, FIG. 3 illustrates an example of the processing of the control program executed by the management apparatus 30 and also illustrates an example of the control method for the information processing system SYS1.

When the amount of data held in the magnetic disk device A0 exceeds a predetermined amount (for example, 70% of the storage capacity), the management apparatus 30 instructs the information processing apparatus 20 to stop the rotation of the motor of the magnetic disk device A0 to put the magnetic disk device A0 into the spin-down state SD. The management apparatus 30 also instructs the information processing apparatus 20 to rotate the motor of the magnetic disk device A1 to put the magnetic disk device A1 into the spin-up state SU. The magnetic disk device A0 denoted by a thick dashed line indicates that data exceeding the predetermined amount has been written thereto and it has been put into the spin-down state SD.

After the data denoted by the star, rhombus, and triangle are written to the magnetic-disk-device groups MDp and MDa through the processing described above with reference to FIG. 2, data denoted by a square and a circle are redundantly written to the magnetic-disk-device groups MDp and MDa, as illustrated in FIG. 3. As a result, for example, the data denoted by the square is redundantly written to the magnetic disk device P3 and the magnetic disk device A1, and the data denoted by the circle is redundantly written to the magnetic disk device P2 and the magnetic disk device A1.

Subsequently, the management apparatus 30 outputs a read request to the information processing apparatus 10 to read the data, denoted by the square and the star, from the corresponding magnetic disk devices P3 and P0. Also, in FIG. 3, the management apparatus 30 does not issue a read request to the information processing apparatus 20.

When no data is readable from the information processing apparatus 10 because of a fault in a transmission channel through which data is transmitted, a failure in the magnetic disk devices P0 to P3, a failure in the information processing apparatus 10, or the like, the management apparatus 30 issues a read request to the information processing apparatus 20. When the data to be read exists in the magnetic disk device A1 in the spin-up state SU, the information processing apparatus 20 accesses the magnetic disk device A1 to read the data therefrom. On the other hand, when data to be read exists in the magnetic disk device A0 in the spin-down state SD, the information processing apparatus 20 rotates the motor of the magnetic disk device A0 to put the magnetic disk device A0 into the spin-up state SU. Then, after reading the data, the information processing apparatus 20 stops the rotation of the motor of the magnetic disk device A0 to return the magnetic disk device A0 to the spin-down state SD.

In the embodiment illustrated in FIGS. 1 to 3, putting the magnetic disk devices in the information processing apparatus 20, except for one of the magnetic disk devices A0 to A3, into the spin-down state SD makes it possible to reduce the power consumption of the information processing system SYS1, compared with that in the related art. In the magnetic-disk-device group MDa, the magnetic disk devices (for example, A0, A2, and A3), except for a predetermined number of magnetic disk devices (for example, A1), are put into the spin-down state SD. Maintaining a minimum number of magnetic disk devices A in the spin-up state SU makes it possible to maintain the power consumption of the magnetic-disk-device group MDa, regardless of the storage capacity of the magnetic-disk-device group MDa. In other words, the larger the storage capacity of the magnetic-disk-device group MDa is, the higher the power-consumption reduction efficiency that may be achieved.

For example, the power consumption of the magnetic disk device put into the spin-down state SD is about one-third of the power consumption of the magnetic disk device put into the spin-up state SU, and thus, it is possible to achieve an about 67% reduction in the power consumption per magnetic disk device put into the spin-down state SD. In this case, since the data reading is executed by the information processing apparatus 10, it is possible to reduce the power consumption of the information processing system SYS1 without a reduction in the access performance.

The spin down of the magnetic disk devices A is executed when data exceeding a predetermined amount has been written thereto. The spin up of the magnetic disk devices A is executed when the magnetic disk device A to which data is to be written is changed or when data is to be read from the magnetic disk device A that has been spun down. In this embodiment, the magnetic disk device A to which data is to be written is switched in accordance with the free space on the magnetic disk device A. Thus, compared with a case in which data is randomly written to the plurality of magnetic disk devices A and the data is read therefrom, it is possible to reduce the frequency of spin up and spin down. As a result, compared with a case in which spin up and spin down are frequently executed, it is possible to suppress deterioration of the magnetic disk devices A.

Since the magnetic disk devices P0 to P3 in the magnetic-disk-device group MDp are maintained in the spin-up state SU, data may be read from the magnetic disk device(s) P with no delay in response to an access request. That is, compared with a case in which the magnetic disk device(s) P are spun up after a read request is received, it is possible to increase the data reading speed.

Since data is redundantly held in the magnetic-disk-device groups MDp and MDa, it is possible to read the data from the information processing apparatus 20, when the data is not readable from the information processing apparatus 10. Accordingly, it is possible to maintain the reliability of data held in the information processing system SYS1.

Putting the magnetic disk device A0 into the spin-up state SU makes it possible to read data from the magnetic disk device A0 in the spin-down state SD. The information processing system SYS1, however, is a multiplexed system that redundantly holds data. Accordingly, reading data from the magnetic disk device A0 in the spin-down state SD is limited to a case in which data is not readable from the information processing apparatus 10 and the data is not stored in the magnetic disk device A1 in the spin-up state SU. This makes it possible to reduce the power consumption of the information processing system SYS1 while suppressing a decline in the access performance.

Figure 4:
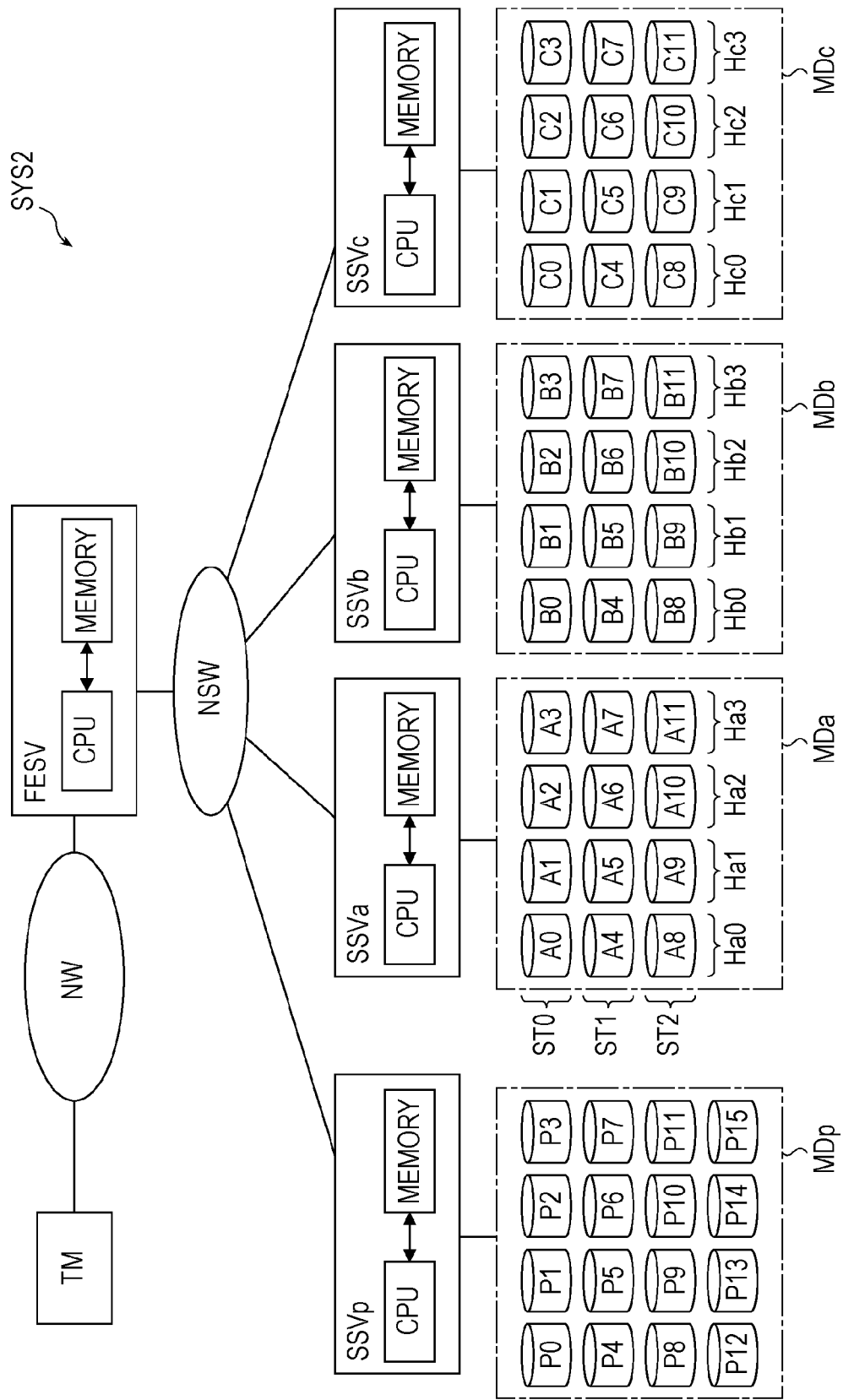
FIG. 4 illustrates another embodiment of the information processing system, the control program for the management apparatus, and the control method for the information processing system.

FIG. 4 illustrates another embodiment of the information processing system, the control program for the management apparatus, and the control method for the information processing system. Elements that are the same as or similar to those described in the embodiment illustrated in FIGS. 1 to 3 are denoted by the same reference numerals, and detailed descriptions thereof are not given hereinafter.

An information processing system SYS2 according to this embodiment includes a front-end server FESV, a network switch NSW, storage servers SSVp, SSVa, SSVb, and SSVc, and magnetic-disk-device groups MDp, MDa, MDb, and MDc. For example, the front-end server FESV is connected to a terminal TM, which uses the information processing system SYS2 as a network storage, through a network NW, such as the Internet, to control the overall operation of the information processing system SYS2.

The front-end server FESV includes a CPU and a memory that stores therein a program executed by the CPU, as in the management apparatus 30 illustrated in FIG. 1. That is, the front-end server FESV is an example of a management apparatus that manages the storage servers SSVp, SSVa, SSVb, and SSVc.

The terminal TM may be included in a computer apparatus that executes an application program that uses the information processing system SYS2 as a network storage or may be included in a computer apparatus of a user of the application program. The information processing system SYS2 may also be connected to a plurality of terminals TM through the network NW.

Each of the storage servers SSVp, SSVa, SSVb, and SSVc includes a CPU and a memory that stores therein a program executed by the CPU, as in the information processing apparatus 10 illustrated in FIG. 1. That is, each of the storage servers SSVp, SSVa, SSVb, and SSVc is an example of the information processing apparatus.

The magnetic-disk-device group MDp includes a plurality of magnetic disk devices P (P0, P1, P2, P3, P4, P5, P6, P7, P8, P9, P10, P11, P12, P13, P14, and P15). The magnetic disk devices P included in the magnetic-disk-device group MDp are maintained in the spin-up state, during operation of the information processing system SYS2. The information processing system SYS2 may also include a plurality of storage servers SSVp and a plurality of magnetic-disk-device groups MDp coupled to the plurality of storage servers SSVp. In such a case, data from the front-end server FESV is redundantly written to the magnetic disk devices P in the plurality of magnetic-disk-device groups MDp.

The magnetic-disk-device group MDa includes a plurality of magnetic disk devices A (A0, A1, A2, A3, A4, A5, A6, A7, A8, A9, A10, and A11). The magnetic-disk-device group MDb includes a plurality of magnetic disk devices B (B0, B1, B2, B3, B4, B5, B6, B7, B8, B9, B10, and B11). The magnetic-disk-device group MDc includes a plurality of magnetic disk devices C (C0, C1, C2, C3, C4, C5, C6, C7, C8, C9, C10, and C11). For example, the magnetic disk devices P, A, B, and C are hard-disk drive devices. For example, the magnetic disk devices P0 to P15 in the magnetic-disk-device group MDp are accommodated in one housing, and the magnetic disk devices A0 to A11 in the magnetic-disk-device group MDa are accommodated in one housing. Similarly, the magnetic disk devices B0 to B11 in the magnetic-disk-device group MDb are accommodated in one housing, and the magnetic disk devices C0 to C11 in the magnetic-disk-device group MDc are accommodated in one housing.

As described below and illustrated in FIGS. 10 and 11, in state ST0, the magnetic disk devices A0 to A3, B0 to B3, and C0 to C3 are put into the spin-up state in which the rotation of the spindle motors is maintained. In state ST0, the magnetic disk devices A4 to A11, B4 to B11, and C4 to C11 are put into the spin-down state in which the rotation of the spindle motors is stopped.

In state ST1, the magnetic disk devices A4 to A7, B4 to B7, and C4 to C7 are put into the spin-up state, and the magnetic disk devices A0 to A3, A8 to A11, B0 to B3, B8 to B11, C0 to C3, and C8 to C11 are put into the spin-down state. In state ST2, the magnetic disk devices A8 to A11, B8 to B11, and C8 to C11 are put into the spin-up state, and the magnetic disk devices A0 to A7, B0 to B7, and C0 to C7 are put into the spin-down state.

On the other hand, the magnetic-disk-device groups P0 to P15 are put into the spin-up state in which the rotation of the spindle motors is maintained, regardless of states ST0 to ST2. In a normal state, the magnetic-disk-device group MDp serves as a primary storage region on which data writing is executed in response to a write request and on which data reading is executed in response to a read request. In the normal state, the magnetic-disk-device group MDa serves as a non-primary storage region on which data writing is executed in response to a write request and on which data reading in response to a read request is not executed.

The numbers of magnetic disk devices P, A, B, C, and D are not limited to those illustrated in FIG. 4. For example, the magnetic-disk-device group MDp may include 256 magnetic disk devices P, and the magnetic-disk-device groups MDa, MDb, and MDc may include 64 magnetic disk devices A, B, and C, respectively.

In the magnetic-disk-device group MDa, the magnetic disk devices A0, A4, and A8 are allocated to a hash space Ha0, and the magnetic disk groups A1, A5, and A9 are allocated to a hash space Ha1. The magnetic disk devices A2, A6, and A10 are allocated to a hash space Ha2, and the magnetic disk groups A3, A7, and A11 are allocated to a hash space Ha3.

The magnetic disk devices B0, B4, and B8 are allocated to a hash space Hb0, and the magnetic disk groups B1, B5, and B9 are allocated to a hash space Hb1. The magnetic disk devices B2, B6, and B10 are allocated to a hash space Hb2, and the magnetic disk groups B3, B7, and B11 are allocated to a hash space Hb3.

Figure 5:
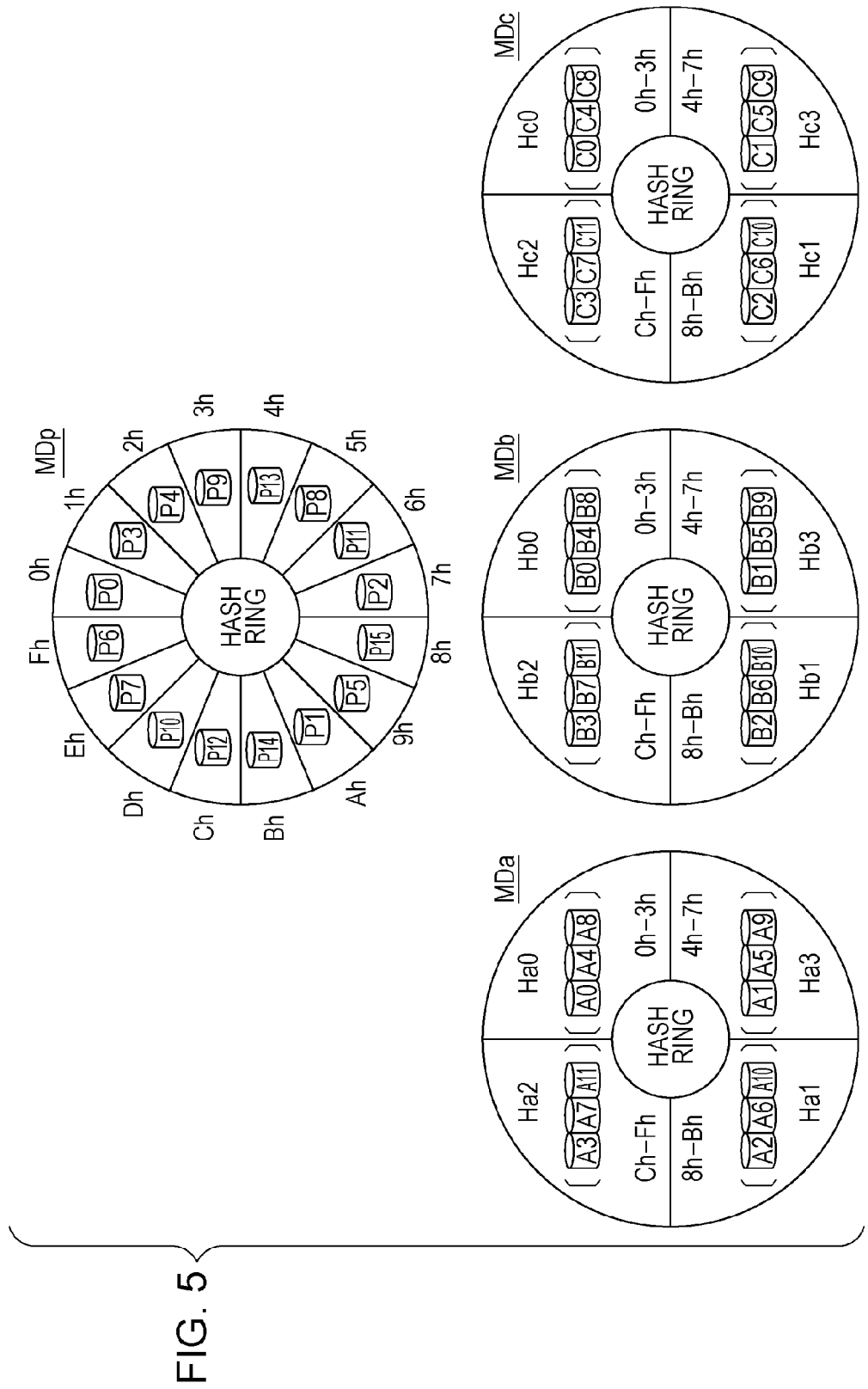
FIG. 5 illustrates an example of allocating magnetic disk devices in the magnetic-disk-device groups illustrated in FIG. 4 to hash spaces.

The magnetic disk devices C0, C4, and C8 are allocated to a hash space Hc0, and the magnetic disk groups C1, C5, and C9 are allocated to a hash space Hc1. The magnetic disk devices C2, C6, and C10 are allocated to a hash space Hc2, and the magnetic disk groups C3, C7, and C11 are allocated to a hash space Hc3. FIG. 5 illustrates an example of the hash spaces Ha0 to Ha3, Hb0 to Hb3, and Hc0 to Hc3.

Figure 10:
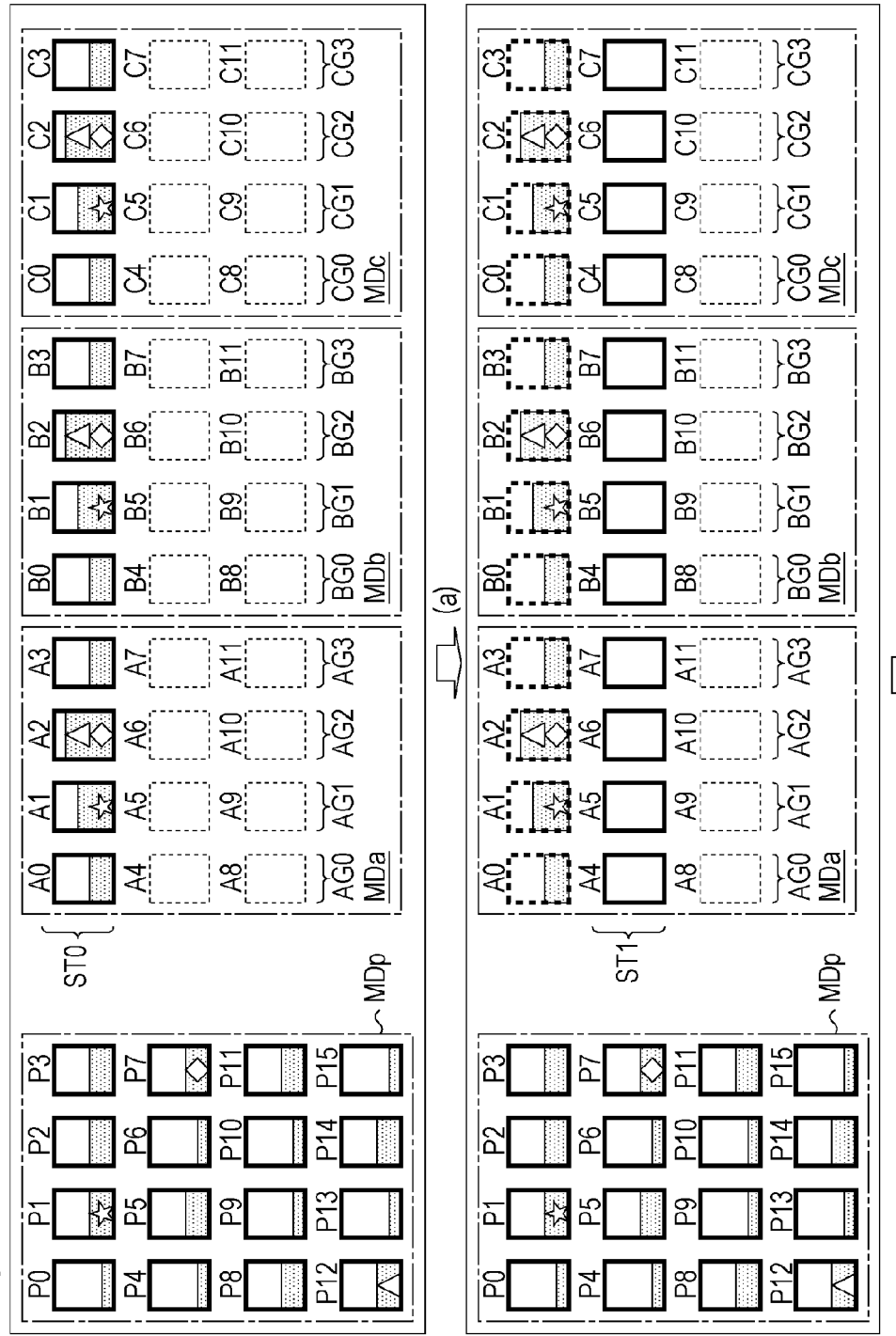
FIG. 10 illustrates an example of the operation of the information processing system illustrated in FIG. 4.
Figure 11:
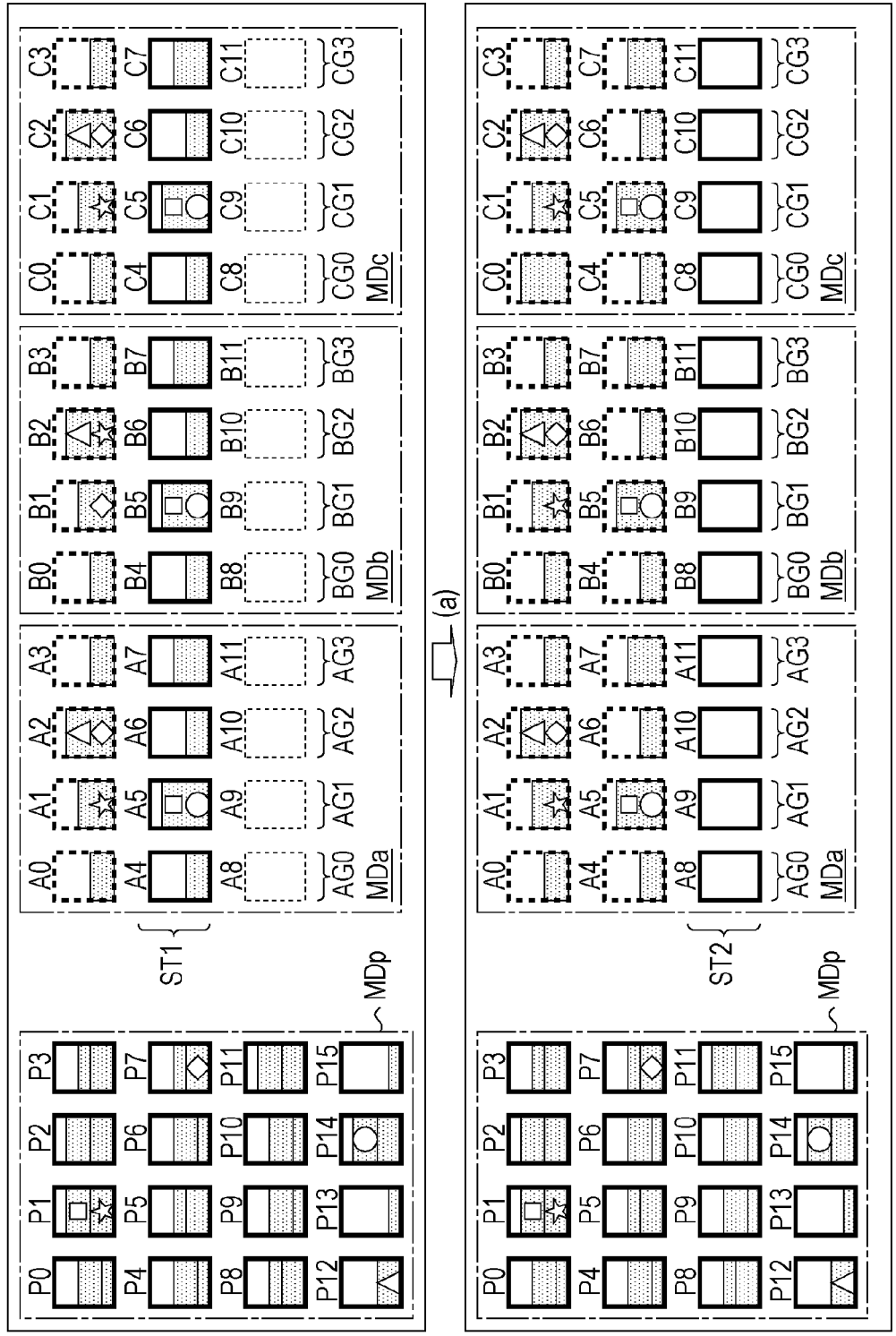
FIG. 11 illustrates another example of the operation of the information processing system illustrated in FIG. 4.

For example, as illustrated in FIGS. 10 and 11, the information processing system SYS2 redundantly writes data, received from the terminal TM, to the magnetic-disk-device groups MDp, MDa, MDb, and MDc. That is, when data is to be written, the front-end server FESV outputs a data write request to any of the magnetic disk devices P, any of the magnetic disk devices A, any of the magnetic disk devices B, and any of the magnetic disk devices C.

Also, in response to a read request from the terminal TM, the information processing system SYS2 accesses the magnetic-disk-device group MDp to read data therefrom. That is, the front-end server FESV outputs a read request to any of the magnetic disk devices P included in the magnetic-disk-device group MDp. When data is not readable from the magnetic-disk-device group MDp, the information processing system SYS2 accesses any of the magnetic-disk-device groups MDa, MDb, and MDc to read data therefrom. This makes it possible to ensure the reliability of data held in the information processing system SYS2.

FIG. 5 illustrates an example of allocating the magnetic disk devices P, A, B, and C in the magnetic-disk-device groups MDp, MDa, MDb, and MDc illustrated in FIG. 4 to the hash spaces. In FIG. 5, the hash spaces are represented as hash rings.

For example, by using a hash function, the front-end server FESV illustrated in FIG. 4 determines the magnetic disk devices P, A, B, and C to which data is to be written. More specifically, in accordance with a hash value obtained by inputting an identifier for identifying data (for example, a path name or a file name of data) to a hash function, the front-end server FESV determines the magnetic disk devices P, A, B, and C to which data is to be written.

In the magnetic-disk-device group MDp, for example, the destination to which data is to be written is determined to be one of the 16 magnetic disk devices P0 to P15, in accordance with the top 4 bits (0h-Fh: "h" indicates a hexadecimal number) of a hash value.

The destination to which data is to be written in the magnetic disk device MDa is determined to be one of the four hash spaces Ha0, Ha1, Ha2, and Ha3, for example, in accordance with the top 2 bits of the hash value. For example, when the hash value is 0h-3h (the top 2 bits are "00"), the destination to which data is to be written is determined to be one of the magnetic disk devices A0, A4, and A8. To which of the magnetic disk devices A0, A4, and A8 data is to be written is described below with reference to FIGS. 6 and 7. When the hash value is 4h-7h (the top 2 bits are "01"), the destination to which data is to be written is determined to be one of the magnetic disk devices A1, A5, and A9. When the hash value is 8h-Bh (the top 2 bits are "10"), the destination to which data is to be written is determined to be one of the magnetic disk devices A2, A6, and A10. When the hash value is Ch-Fh (the top 2 bits are "11"), the destination to which data is to be written is determined to be one of the magnetic disk devices A3, A7, and A11.

Similarly, the destination to which data is to be written in the magnetic disk device MDb is determined to be one of the four hash spaces Hb0, Hb1, Hb2, and Hb3, in accordance with the top 2 bits of the hash value. The destination to which data is to be written in the magnetic disk device MDc is determined to be one of the four hash spaces Hc0, Hc1, Hc2, and Hc3, in accordance with the top 2 bits of the hash value. For example, the magnetic disk devices A are allocated to one of the hash spaces through use of a common hash function, the magnetic disk devices B are allocated to one of the hash spaces through use of the common hash function, and the magnetic disk devices C are allocated to one of the hash spaces through use of the common hash function.

In practice, the front-end server FESV generates, for example, a 128-bit hash value by using Message Digest 5 (MD5) as the hash function. Then, with respect to the magnetic-disk-device group MDp, the front-end server FESV determines any of the 256 magnetic disk devices P as the destination to which data is to be written, in accordance with the top 8 bits of the hash value obtained by MD5. With respect to the magnetic-disk-device groups MDa, MDb, and MDc, the front-end server FESV determines any of the 64 magnetic disk devices A, B, and C as the destination to which data is to be written, in accordance with the top 6 bits of the hash value. In this embodiment, however, for clarity of description, the number of hash spaces in the magnetic-disk-device group MDp is assumed to be 16, and the number of hash spaces in each of the magnetic-disk-device groups MDa, MDb, and MDc is assumed to be 4.

Figure 6:
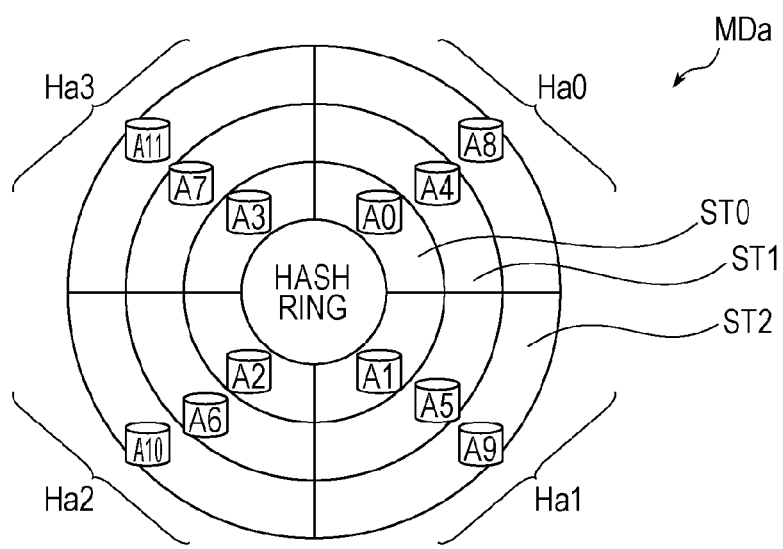
FIG. 6 illustrates an example of a hash ring of the magnetic-disk-device group illustrated in FIG. 4.

FIG. 6 illustrates an example of the hash ring of the magnetic-disk-device group MDa illustrated in FIG. 4. In the magnetic-disk-device group MDa, the magnetic disk devices A allocated to the hash spaces are changed for each of the states ST (ST0, ST1, and ST2).

Figure 7:
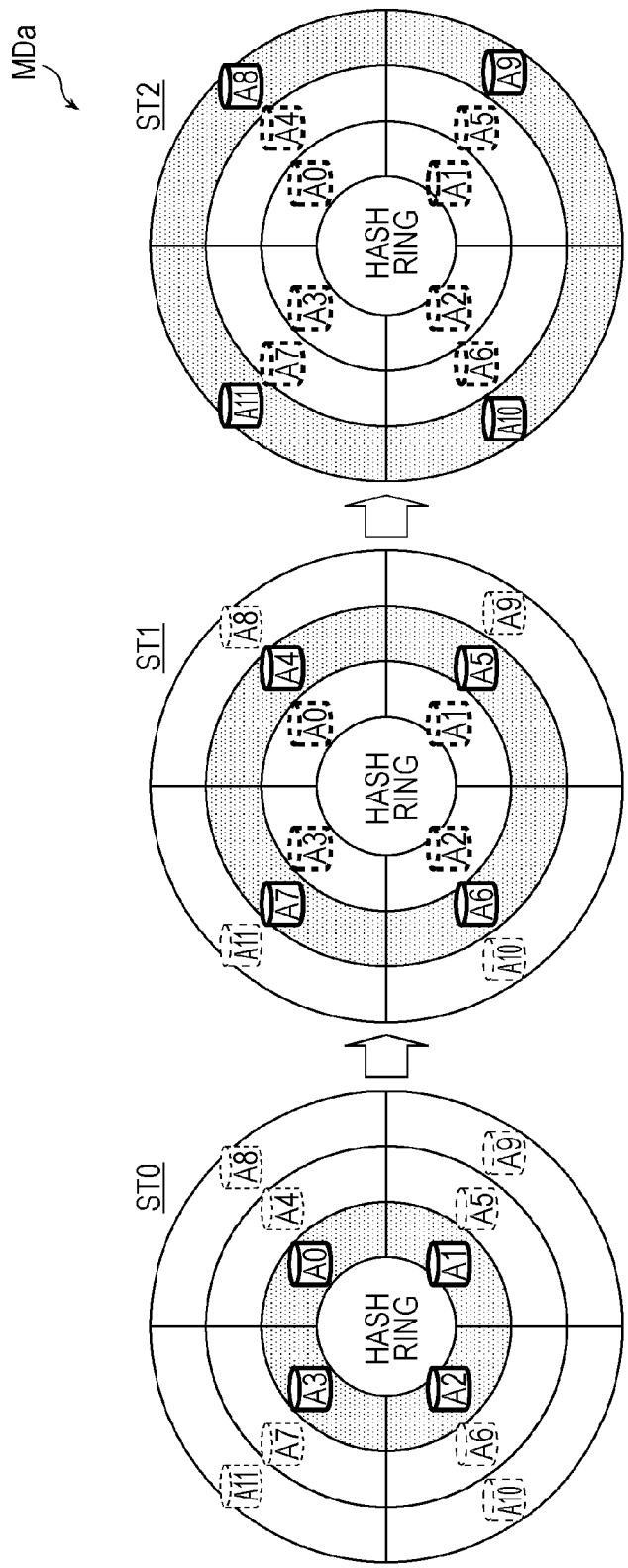
FIG. 7 illustrates an example of changes in states in the hash ring illustrated in FIG. 6.

In the magnetic-disk-device groups MDb and MDc, the magnetic disk devices B and C allocated to the hash spaces are also changed for each of states ST0, ST1, and ST2, as in the case illustrated in FIG. 6. In the magnetic-disk-device group MDb, the magnetic disk devices B allocated to the hash spaces are represented by replacing the codes A and a of the magnetic disk devices in FIG. 6 with codes B and b. Similarly, in the magnetic-disk-device group MDc, the magnetic disk devices C allocated to the hash spaces are represented by replacing the codes A and a of the magnetic disk devices in FIG. 6 with codes C and c. FIGS. 7, 10, and 11 illustrate examples of changes in states ST0, ST1, and ST2.

FIG. 7 illustrates an example of changes in states ST0, ST1, and ST2 in the hash ring illustrated in FIG. 6. While FIG. 7 illustrates an example of changes in states ST0, ST1, and ST2 of the magnetic-disk-device group MDa, states ST0, ST1, and ST2 of the magnetic-disk-device groups MDb and MDc also change as in FIG. 7. Changes in states ST0, ST1, and ST2 of the magnetic-disk-device groups MDb and MDc are represented by replacing the code A of the magnetic disk devices in FIG. 7 with respective codes B and C.

As in the case in FIG. 3, the magnetic disk devices A denoted by thick solid lines indicate that they are in the spin-up state, and the magnetic disk devices A denoted by thin dashed lines indicate that they are in the spin-down state. The magnetic disk devices A denoted by thick dashed lines indicate that data exceeding a predetermined amount has been written thereto and they have been put into the spin-down state.

The magnetic disk devices A included in a hatched region indicate that they are allocated to the hash spaces in each of states ST0, ST1, and ST2. In this embodiment, when the amount of data held in any of the magnetic disk devices A0 to A3 exceeds the predetermined amount in state ST0, the storage server SSVa changes the state of the magnetic-disk-device group MDa from state ST0 to state ST1. When the amount of data held in any of the magnetic disk devices A4 to A7 exceeds the predetermined amount in state ST1, the storage server SSVa changes the state of the magnetic-disk-device group MDa from state ST1 to state ST2.

For example, in state ST0, the magnetic disk devices A0, A1, A2, and A3 are allocated to the hash spaces Ha0, Ha1, Ha2, and Ha3, respectively. In state ST1, the magnetic disk devices A4, A5, A6, and A7 are allocated to the hash spaces Ha0, Ha1, Ha2, and Ha3, respectively. In state ST2, the magnetic disk devices A8, A9, A10, and A11 are allocated to the hash spaces Ha0, Ha1, Ha2, and Ha3, respectively.

As illustrated in FIG. 7, allocating the magnetic disk devices A accessed in each of the states ST0 to ST2 to the corresponding hash spaces makes it possible to change the magnetic disk devices A to which data is to be written, without changing the hash function, even when the state ST is changed. Accordingly, it is possible to facilitate data write control executed by the front-end server FESV, compared with a case in which the hash function is changed each time the state ST is changed.

FIG. 8 illustrates an example of a device table DTBL indicating associations of the magnetic disk devices P, A, B, and C coupled to the storage servers SSVp, SSVa, SSVb, and SSVc illustrated in FIG. 4. For example, the device table DTBL is stored in a storage device built into each of the front-end server FESV and the storage servers SSVp, SSVa, SSVb, and SSVc. The storage device is a semiconductor storage device, such as a dynamic random-access memory (DRAM), a static random-access memory (SRAM), or a flash memory.

The device table DTBL includes a field that holds a device identity (ID), a field that holds a mount point, and a field that holds an internet protocol (IP) address, for each of the magnetic disk devices P0 to P15 in the magnetic-disk-device group MDp. In the fields for the magnetic-disk-device group MDp in the device table DTBL, the number at the end of each device ID and the number at the end of each mount point correspond to the number at the end of the corresponding magnetic disk device P. For example, device ID "devP0" indicates the magnetic disk device P0, and device ID "devP15" indicates the magnetic disk device P15.

The device table DTBL further includes fields that hold states ST0 to ST2 to be assigned, fields that hold identifiers, fields that hold mount points, and fields that hold IP addresses, for each of the magnetic disk devices A0 to A11 in the magnetic-disk-device group MDa. The device table DTBL further includes fields that hold states ST0 to ST2, fields that hold identifiers, fields that hold mount points, and fields that hold IP addresses, in association with the magnetic-disk-device groups MDb and MDc, as in the magnetic-disk-device group MDa.

The device IDs associated with the magnetic-disk-device groups MDa, MDb, and MDc are allocated to the corresponding hash spaces Ha0 to Ha3, Hb0 to Hb3, and Hc0 to Hc3 illustrated in FIG. 5. In the fields for the magnetic-disk-device groups MDa, MDb, and MDc in the device table DTBL, the last three characters of the device IDs correspond to the hash spaces Ha0 to Ha3, Hb0 to Hb3, and Hc0 to Hc3. In the fields for the magnetic-disk-device groups MDa, MDb, and MDc in the device table DTBL, the numbers at the ends of the mount points correspond to the numbers at the ends of the corresponding magnetic disk devices A, B, and C.

For example, when a Serial Attached SCSI (Small Computer System Interface) standard, also called a SAS standard, is employed for the magnetic disk devices A, B, C, and D, SAS addresses may also be used as the identifiers. When the positions at which the magnetic disk devices P, A, B, and C are mounted are identifiable based on the identifiers or the like, the fields that hold the mount points may also be omitted from the device table DTBL.

FIG. 9 illustrates an example of a hash table HTBL indicating relationships between hash values and the magnetic disk devices P, A, B, and C in the magnetic-disk-device groups MDp, MDa, MDb, and MDc illustrated in FIG. 4. The hash table HTBL includes the same contents as those of the hash ring illustrated in FIG. 5, except that the device IDs are used instead of the names of the magnetic disk devices P, A, B, and C. The relationships between the device IDs and the magnetic disk devices P, A, B, and C are analogous to those illustrated in FIG. 8. For example, the hash table HTBL is stored in the storage device, such as a DRAM, SRAM, or flash memory, built into each of the front-end server FESV and the storage servers SSVp, SSVa, SSVb, and SSVc.

The devices IDs (devP0 to devP15) assigned to the magnetic disk devices P0 to P15 in the magnetic-disk-device group MDp are identified with the top 4 bits of the 128-bit hash value. The device IDs (devHa0 to devHa3, devHb0 to devHb3, and devHc0 to devHc3) assigned to the magnetic disk devices A, B, and C in the magnetic-disk-device groups MDa, MDb, and MDc are identified with the top 2 bits of the hash value. In the hash values indicated in the parentheses in FIG. 9, code "b" added to the end of each number indicates a binary number.

FIG. 10 illustrates an example of the operation of the information processing system SYS2 illustrated in FIG. 4. More specifically, FIG. 10 illustrates an example of the operation of the control program executed by the front-end server FESV and also illustrates an example of a control method for the information processing system SYS2. As in the case in FIGS. 2 and 3, some of write data are denoted by stars, rhombi, and triangles. The meanings of thick solid lines, thin dashed lines, and thick dashed lines representing the magnetic disk devices A0, A1, and so on are the same as those illustrated in FIGS. 3 and 7. That is, the thick solid lines indicate the spin-up state, the thin dashed lines indicate the spin-down state, and the thick dashed lines indicate that data exceeding the predetermined amount has been written and the corresponding magnetic disk devices have been put into the spin-down state. Hatching indicated in the magnetic disk devices P0, A0, and so on indicates written data, and the area of the hatching indicates the amount of the written data.

First, when starting a function of the network storage of the information processing system SYS2, the front-end server FESV sets the state of the magnetic-disk-device groups MDa, MDb, and MDc into state ST0, which is an initial state. In state ST0, the magnetic disk devices A0 to A3, B0 to B3, and C0 to C3 are put into the spin-up state and are then mounted to become recognizable by the corresponding storage servers SSVa, SSVb, and SSVc. The magnetic disk devices P0 to P15 in the magnetic-disk-device group MDp are put into the spin-up state and are then mounted to become recognizable by the storage server SSVp.

Upon receiving a write data from the terminal TM, the front-end server FESV determines a hash value of the write data by using a hash function, and writes the data to the magnetic disk devices P, A, B, and C determined based on the hash table HTBL and the device table DTBL. Writing data to the magnetic-disk-device groups MDa, MDb, and MDc is executed on any of the magnetic disk devices A0 to A3, any of the magnetic disk devices B0 to B3, and any of the magnetic disk devices C0 to C3 assigned to state ST0.

As a result of the data writing, the amount of data held in any (for example, the magnetic disk device B2) of the magnetic disk devices A0 to A3, B0 to B3, and C0 to C3 in which the spin-up state is maintained exceeds a predetermined amount. For example, the predetermined amount is set to about 80% to about 90% of the storage capacity of each of the magnetic disk devices A, B, and C.

When the amount of data held in any of the magnetic disk devices A0 to A3, B0 to B3, and C0 to C3 exceeds the predetermined amount, the front-end server FESV changes the state from state ST0 to state ST1, as indicated by (a) in FIG. 10. As a result of the change from state ST0 to state ST1, the magnetic disk devices A0 to A3, B0 to B3, and C0 to C3 including the magnetic disk device B2 to which the data exceeding the predetermined amount has been written are put into the spin-down state. The magnetic disk devices A4 to A7, B4 to B7, and C4 to C7 assigned to state ST1 are also put into the spin-up state and then are mounted.

In this embodiment, when the amount of data held in any of the magnetic disk devices A, B, and C in the magnetic-disk-device groups MDa, MDb, and MDc exceeds the predetermined amount, all of the magnetic-disk-device groups MDa, MDb, and MDc are changed from state ST0 to state ST1. Thus, even when the storage capacities of the magnetic disk devices A, B, and C in the magnetic-disk-device groups MDa, MDb, and MDc are different from each other, the states ST of the magnetic-disk-device groups MDa, MDb, and MDc may be made to be the same state. As a result, it is possible to facilitate access control on the magnetic-disk-device groups MDa, MDb, and MDc, compared with a case in which the states ST are not made to be the same state.

FIG. 11 illustrates another example of the operation of the information processing system SYS2 illustrated in FIG. 4. FIG. 11 illustrates a continuation of the operation illustrated in FIG. 10. Some of write data are denoted by squares and circles, as in FIGS. 2 and 3.

Upon receiving write data from the terminal TM, the front-end server FESV determines a hash value. In accordance with the determined hash value, the front-end server FESV outputs a write request to the magnetic disk device P and the magnetic disk devices A, B, and C assigned to state ST1, to write the data.

As a result of the data writing, the amount of data held in any (for example, the magnetic disk device A5) of the magnetic disk devices A4 to A7, B4 to B7, and C4 to C7 in which the spin-up state is maintained exceeds the predetermined amount.

When the amount of data held in any of the magnetic disk devices A4 to A7, B4 to B7, and C4 to C7 exceeds the predetermined amount, the front-end server FESV changes the current state to a next state (that is, ST2), as indicated by (a) in FIG. 11. As a result of the change from state ST1 to state ST2, the magnetic disk devices A4 to A7, B4 to B7, and C4 to C7 including the magnetic disk device A5 to which the data exceeding the predetermined amount has been written are put into to the spin-down state. The magnetic disk devices A8 to A11, B8 to B11, and C8 to C11 assigned to state ST2 are put into the spin-up state and then are mounted.

Thereafter, upon receiving write data from the terminal TM, the front-end server FESV determines a hash value, and writes the data to the magnetic disk device P and the magnetic disk devices A, B, and C assigned to state ST2, in accordance with the determined hash value.

Figure 12:
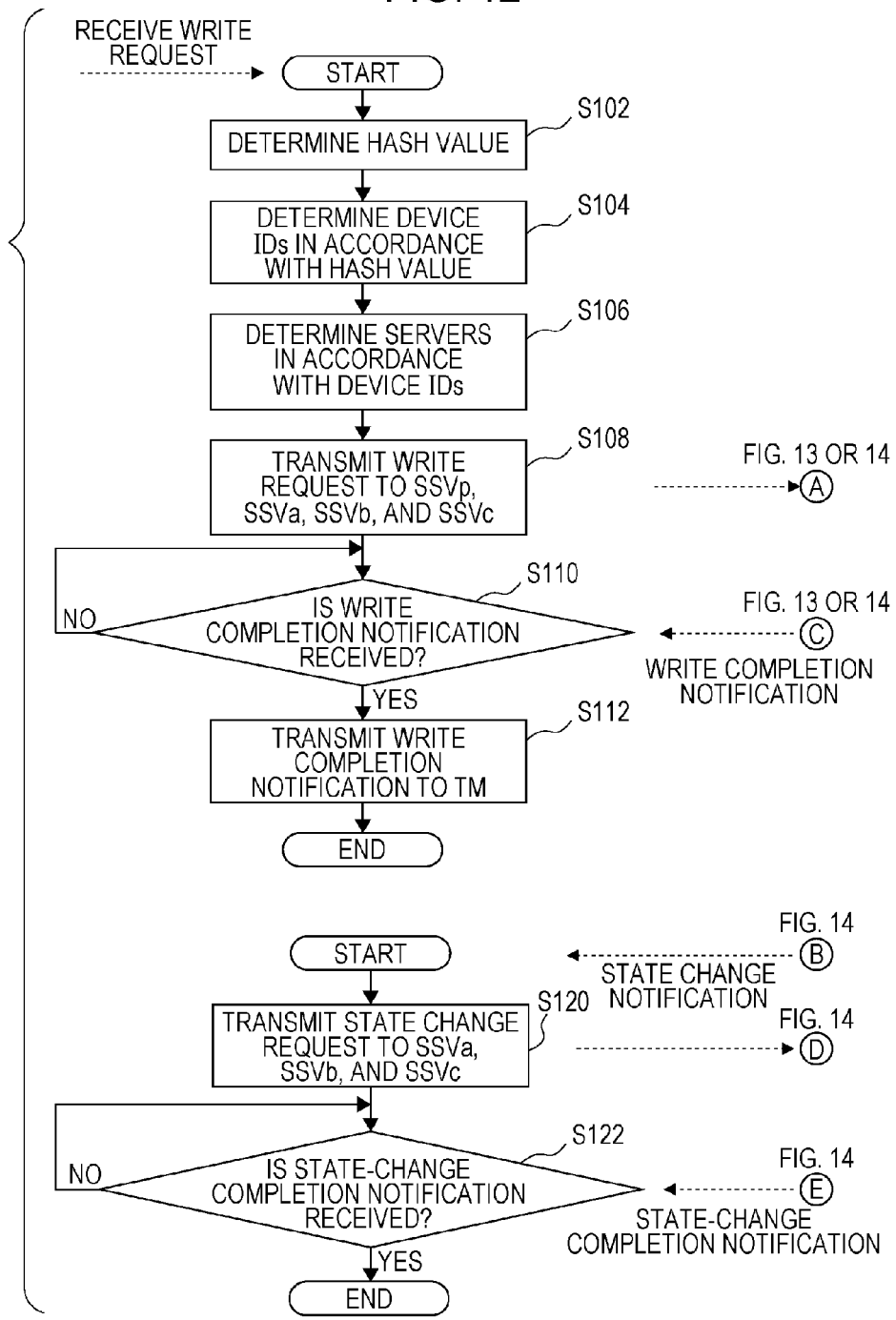
FIG. 12 illustrates an example of data write processing executed by the front-end server illustrated in FIG. 4.

FIG. 12 illustrates an example of data write processing executed by the front-end server FESV illustrated in FIG. 4. The front-end server FESV executes a network-storage control program to thereby realize the processing illustrated in FIG. 12. That is, FIG. 12 illustrates an example of the operation of the control program and an example of the control method for the information processing system SYS2.

Before the front-end server FESV executes data write processing, the terminal TM transmits, for example, a write request to the information processing system SYS2 by using a PUT method. That is, the terminal TM uses PUT as a method for an application program interface (API) using the HyperText Transfer Protocol (HTTP). The terminal TM then specifies a resource to which data is to be written, by using a uniform resource identifier (URI).

For example, when the IP address of the front-end server FESV is "192.168.1.100", the terminal TM transmits "http://192.168.1.100/foo/bar/buz" by the PUT method. In this case, "foo", "bar", and "buz" represent metasyntactic variables. Data to be transmitted is stored in a body that is one type of HTTP tag.

Upon receiving a write request from the terminal TM, in step S102, the front-end server FESV inputs, for example, "/foo/bar/buz" in the URI to a hash function to determine a hash value. For example, MD5 is used to generate a 128-bit hash value.

Next, in step S104, by using the hash table HTBL illustrated in FIG. 9 and in accordance with the determined hash value, the front-end server FESV determines the device IDs of the magnetic disk devices P, A, B, and C to which the data is to be written. For example, for the magnetic-disk-device group MDp, the device ID of the magnetic disk device P to which the data is to be written is determined in accordance with the top 4 bits of the hash value. For the magnetic-disk-device groups MDa, MDb, and MDc, the device IDs of the magnetic disk devices A, B, and C to which the data is to be written are determined in accordance with the top 2 bits of the hash value.

In step S106, the front-end server FESV searches the device table DTBL illustrated in FIG. 8 to determine the IP addresses associated with the device IDs determined in step S104. That is, the front-end server FESV determines the storage servers SSVa, SSVb, and SSVc to which the data is to be written, by using the device IDs.

For example, for specifications in which data is to be written to two of the storage servers SSVa, SSVb, and SSVc, the front-end server FESV randomly selects two of the storage servers SSVa, SSVb, and SSVc to which the data is to be written.

Figure 13:
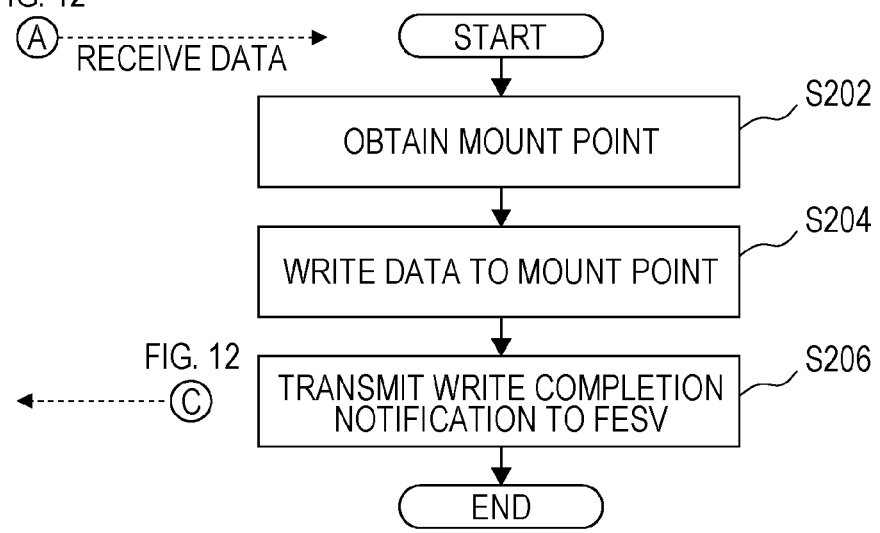
FIG. 13 illustrates an example of data write processing executed by one of the storage servers illustrated in FIG. 4.
Figure 14:
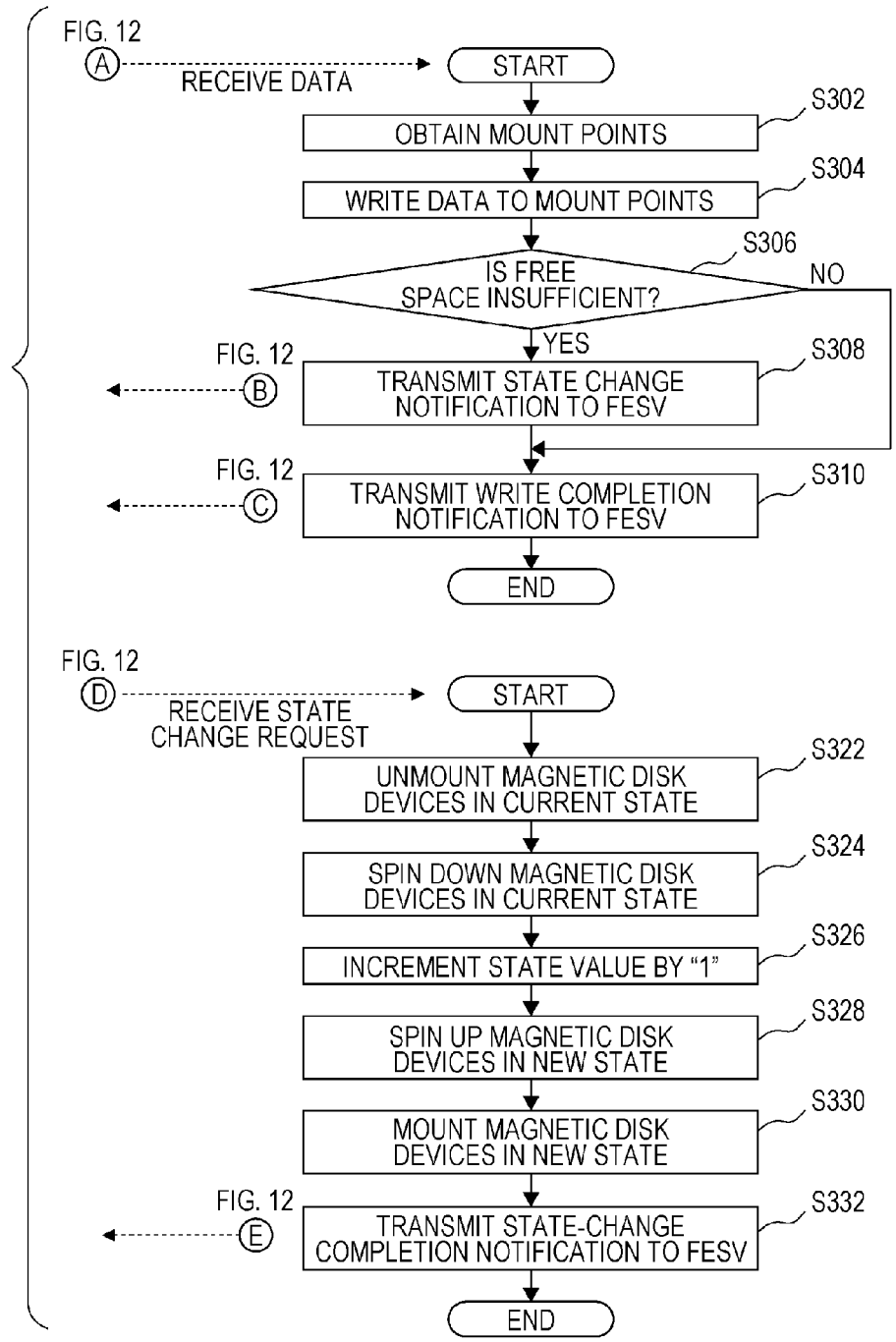
FIG. 14 illustrates an example of data write processing executed by some of the storage servers illustrated in FIG. 4.

Next, in step S108, the front-end server FESV transmits the write data, the device IDs of the storage servers SSVa, SSVb, and SSVc to which the data is to be written, and the hash value (full bit; 128 bits in this example) to the corresponding determined IP addresses. That is, the front-end server FESV outputs a data write request to each of the storage servers SSVp, SSVa, SSVb, and SSVc. FIG. 13 illustrates an example of operations of the storage server SSVp that has received the write request, and FIG. 14 illustrates an example of operations of the storage servers SSVa, SSVb, and SSVc that have received the write request.

When the information processing system SYS2 includes a plurality of storage servers SSVp, the front-end server FESV outputs a data write request to each of the plurality of storage servers SSVp and the storage servers SSVa, SSVb, and SSVc.

In step S110, the front-end server FESV waits to receive a write completion notification indicating that the data writing has been completed, the write completion notification being transmitted from each of the storage servers SSVp, SSVa, SSVb, and SSVc. When the front-end server FESV receives the write completion notification from each of the storage servers SSVp, SSVa, SSVb, and SSVc, the process proceeds to step S112 in which the front-end server FESV transmits a notification indicating that the data writing has been completed to the terminal TM and then ends the data write processing.

On the other hand, when the front-end server FESV receives a state change notification from any of the storage servers SSVa, SSVb, and SSVc, the process proceeds to step S120 in which the front-end server FESV transmits, to the storage servers SSVa, SSVb, and SSVc, a state change request for changing the state. As illustrated in FIGS. 10 and 11, the state change is executed when the amount of data held in any of the magnetic disk devices A, B, and C assigned in correspondence with the current state exceeds the predetermined amount. FIG. 14 illustrates an example of state change processing executed by the storage servers SSVa, SSVb, and SSVc.

Next, in step S122, the front-end server FESV waits to receive a state-change completion notification transmitted from the storage servers SSVa, SSVb, and SSVc and indicating that the state has changed. Upon receiving the state-change completion notification, the front-end server FESV ends the state change processing.

FIG. 13 illustrates an example of data write processing executed by the storage server SSVp illustrated in FIG. 4. The storage server SSVp executes a data-write control program to thereby realize the processing illustrated in FIG. 13.

First, in step S202, by referring to the device table DTBL illustrated in FIG. 8, the storage server SSVp obtains a mount point associated with the device ID received from the front-end server FESV. Next, in step S204, the storage server SSVp writes the data, received from the front-end server FESV, to the magnetic disk device P mounted at the obtained mount point. In this case, by using the full-bit hash value as a file name, the storage server SSVp writes the data to the magnetic disk device P.

Next, in step S206, the storage server SSVp transmits a write completion notification, which indicates that the data writing has been completed, to the front-end server FESV and then ends the data write processing.

FIG. 14 illustrates an example of data write processing executed by the storage servers SSVa, SSVb, and SSVc illustrated in FIG. 4. The storage servers SSVa, SSVb, and SSVc execute the respective data-write control programs independently from each other to thereby realize the processing illustrated in FIG. 14.

First, in step S302, by referring to the device table DTBL illustrated in FIG. 8, the storage servers SSVa, SSVb, and SSVc obtain the mount points associated with the device IDs received from the front-end server FESV and the current state. The current state is one of states ST0 to ST2 and is recognized by each of the storage servers SSVa, SSVb, and SSVc. In step S304, the storage servers SSVa, SSVb, and SSVc write the data, received from the front-end server FESV, to the magnetic disk devices A, B, and C mounted at the corresponding obtained mount points. In this case, the storage servers SSVa, SSVb, and SSVc write the data to the magnetic disk devices A, B, and C by using the full-bit hash value as a file name.

Next, in step S306, the storage servers SSVa, SSVb, and SSVc determine whether or not the amount of data stored in any of the corresponding magnetic disk devices A, B, and C assigned to the current state has exceeded the predetermined amount as a result of the data writing. That is, a determination is made as to whether or not the free space on any of the magnetic disk devices A, B, and C has become insufficient. When the free space has become insufficient, the process proceeds to step S308 in order to change the state, and when the free space has not become insufficient, the process proceeds to step S310.

In step S308, any of the storage servers SSVa, SSVb, and SSVc transmits a state change notification to the front-end server FESV. Next, in step S310, each of the storage servers SSVa, SSVb, and SSVc transmits a write completion notification, which indicates that the data writing has been completed, to the front-end server FESV, and then ends the data write processing.

On the other hand, when a state change request is received from the front-end server FESV, the process proceeds to step S322 in which the storage servers SSVa, SSVb, and SSVc unmount the corresponding magnetic disk devices A, B, and C corresponding to the current state. The storage servers SSVa, SSVb, and SSVc recognize the magnetic disk devices A, B, and C assigned to the respective states ST0 to ST2, by referring to the device table DTBL illustrated in FIG. 8.

Next, in step S324, the storage servers SSVa, SSVb, and SSVc put the respective magnetic disk devices A, B, and C corresponding to the current state into the spin-down state. Next, in step S326, each of the storage servers SSVa, SSVb, and SSVc increments a state value indicating the state by "1". For example, when the current state is ST0, the state value is incremented from "0" to "1", so that the state is put into ST1.

A power supply for the magnetic-disk-device groups MDa, MDb, and MDc may be divided into power supplies for the respective magnetic disk devices A, B, and C assigned to states ST0 to ST2, and the power supplies for the magnetic-disk-device groups A, B, C put into the spin-down state may be shut down. In this case, compared with a case in which the power supply is not shut down, it is possible to further reduce the power consumption of the magnetic-disk-device groups MDa, MDb, and MDc.

In step S328, the storage servers SSVa, SSVb, and SSVc put the respective magnetic disk devices A, B, and C corresponding to the state set in step S326 into the spin-up state. Next, in step S330, the storage servers SSVa, SSVb, and SSVc mount the magnetic disk devices A, B, and C corresponding to the state set in step S326.

In step S332, each of the storage servers SSVa, SSVb, and SSVc transmits the state-change completion notification, which indicates that the state change has been completed, to the front-end server FESV, and ends the state change processing.

When the storage capacities of the magnetic disk devices A, B, and C in the magnetic-disk-device groups MDa, MDb, and MDc are equal to each other, in step S306, the storage servers SSVa, SSVb, and SSVc simultaneously detect that the free spaces on the magnetic disk devices A, B, and C are insufficient. This is because the common hash function is applied to the magnetic-disk-device groups MDa, MDb, and MDc, and, for example, the free spaces on the magnetic disk devices A2, B2, and C2 to which the common data illustrated in FIG. 10 is written become insufficient simultaneously.

In this case, without changing the states ST of the storage servers SSVa, SSVb, and SSVc under the control of the front-end server FESV, the storage servers SSVa, SSVb, and SSVc may individually change the states ST. Thus, the storage servers SSVa, SSVb, and SSVc may execute steps S322, S324, S326, S328, and S330, instead of step S308. In such a case, the front-end server FESV does not execute steps S120 and S122 illustrated in FIG. 12.

Figure 15:
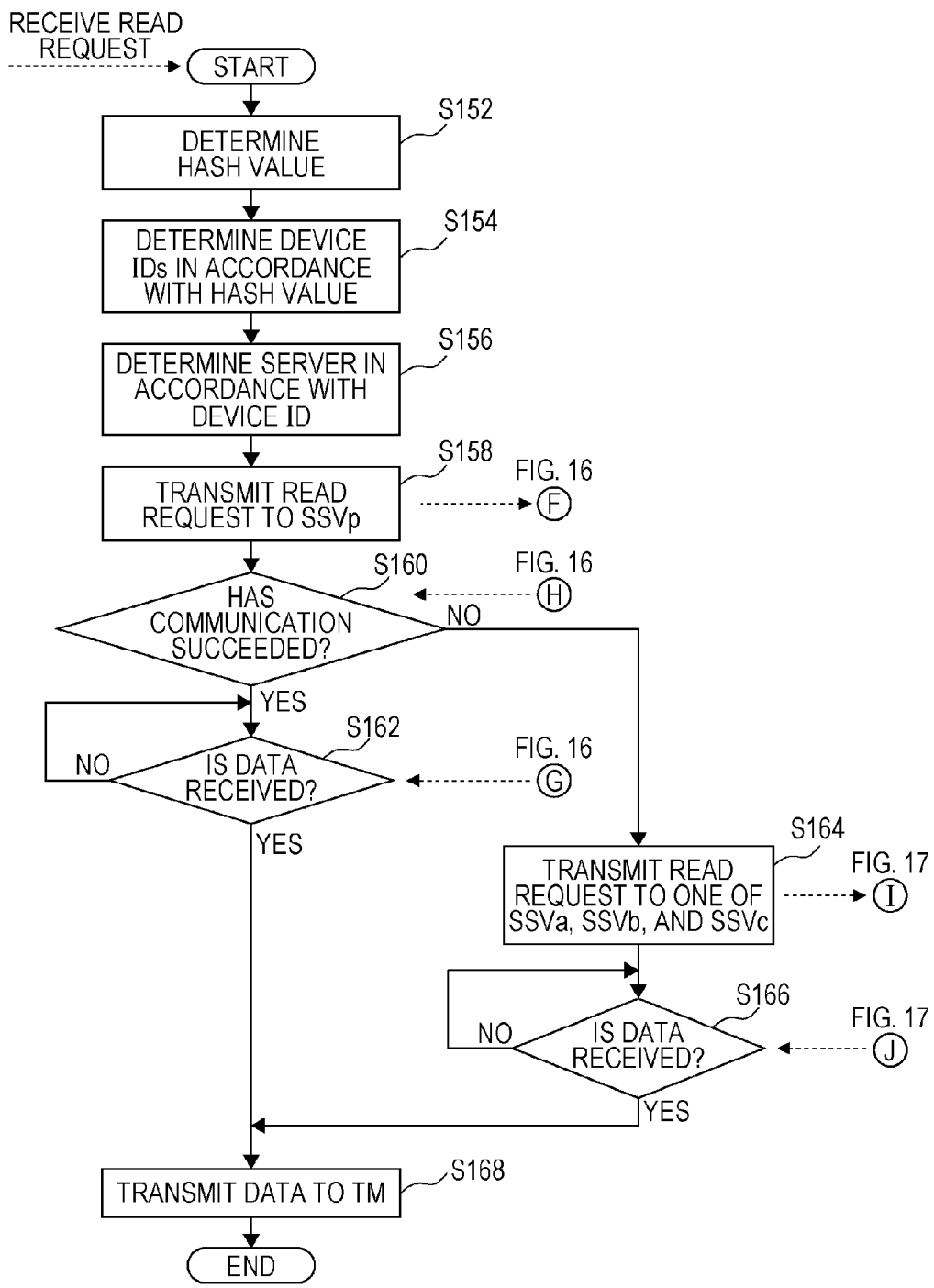
FIG. 15 illustrates an example of read processing executed by the front-end server illustrated in FIG. 4.

FIG. 15 illustrates an example of read processing executed by the front-end server FESV illustrated in FIG. 4. The front-end server FESV executes the network-storage control program to thereby realize the processing illustrated in FIG. 15. That is, FIG. 15 illustrates an example of the operation of the control program and an example of the control method for the information processing system SYS2.

The front-end server FESV first issues a read request to the storage server SSVp, and when data is not readable from the storage server SSVp, the front-end server FESV issues a read request to one of the storage servers SSVa, SSVb, and SSVc. In the same manner for the write request, the terminal TM transmits, for example, a read request to the information processing system SYS2 by using a GET method, and specifies a resource from which data is to be read, by using a URI.

When the front-end server FESV receives the read request from the terminal TM, in step S152, the front-end server FESV determines a 128-bit hash value, for example, by inputting "/foo/bar/buz" in the URI to the hash function.

Next, in step S154, by using the hash table HTBL illustrated in FIG. 9 and in accordance with the determined hash value, the front-end server FESV determines the device ID of the magnetic disk device P from which the data is to be read. In this case, to prepare for an event in which the data is not readable from the magnetic disk device P, the front-end server FESV also determines device IDs including the device IDs of the magnetic disk devices A, B, and C corresponding to the determined hash value.

Next, in step S156, by using the device table DTBL illustrated in FIG. 8, the front-end server FESV searches for the device ID determined in step S154, to determine the IP address of the storage server SSVp from which the data is to be read. That is, the storage server SSVp from which the data is to be read is determined in accordance with the device ID. For example, when the information processing system SYS2 includes a plurality of storage servers SSVp, in step S156, one storage server SSVp from which the data is to be read is selected.

Next, in step S158, the front-end server FESV transmits, to the determined IP address, the device ID of the magnetic disk device P from which the data is to be read and the hash value (full bit; 128 bits in this example). That is, the front-end server FESV outputs a data read request to the storage server SSVp. An example of the operation of the storage server SSVp that has received the data read request is described later with reference to FIG. 16.

In step S160 in FIG. 15, the front-end server FESV determines whether or not communication with the storage server SSVp has succeeded. When the communication has succeeded, the process proceeds to step S162. When the communication has failed because of timeout or the like, the process proceeds to step S164. Examples of the cause of the communication failure include a hang of an operating system (OS) in the storage server SSVp, a failure in the storage server SSVp, a failure in the magnetic disk devices P, and a disconnection in the network.

When the communication has succeeded, in step S162, the front-end server FESV waits until the data is received from the storage server SSVp and receives the data. Thereafter, the front-end server FESV executes a process in step S168.

When the communication has failed, in step S164, the front-end server FESV transmits the device ID and the full-bit hash value to one of the storage servers SSVa, SSVb, and SSVc which corresponds to the device ID. That is, the front-end server FESV transmits a read request to one of the storage servers SSVa, SSVb, and SSVc. In this case, the device ID is one of the device IDs of the magnetic disk devices A, B, and C corresponding to the hash value determined in step S154.

Next, in step S166, the front-end server FESV waits until the data is received from one of the storage servers SSVa, SSVb, and SSVc to which the read request was transmitted. After receiving the data from one of the storage servers SSVa, SSVb, and SSVc, the front-end server FESV executes the process in step S168.

In step S168, the front-end server FESV transmits the data, received from the storage server SSVp or one of the storage servers SSVa, SSVb, and SSVc, to the terminal TM and then ends the data read processing.

Figure 16:
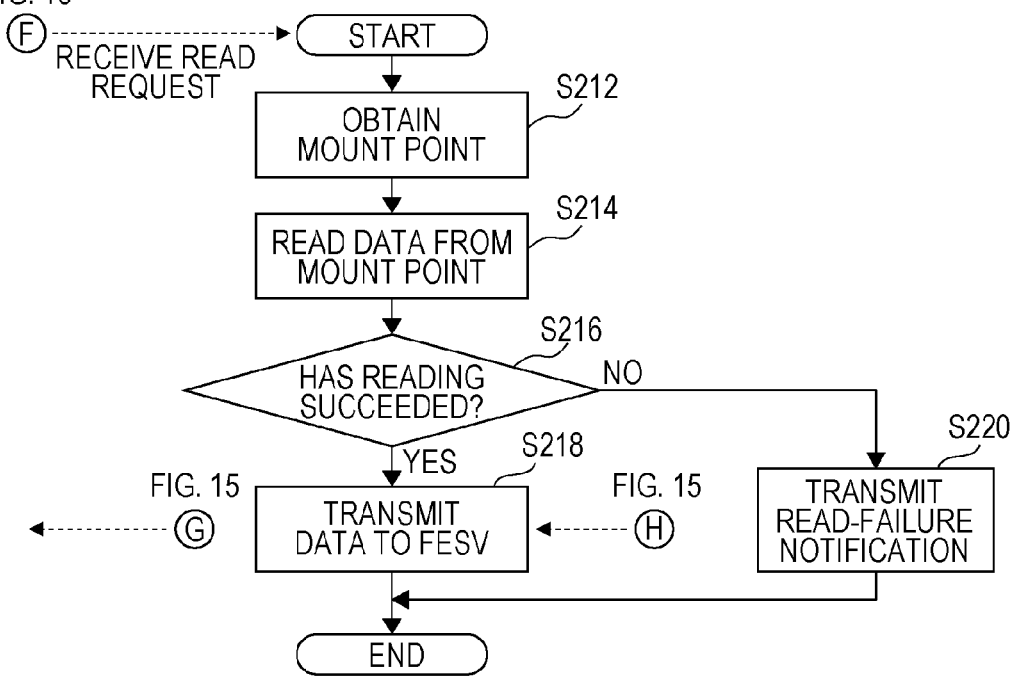
FIG. 16 illustrates an example of data read processing executed by one of the storage servers illustrated in FIG. 4.

FIG. 16 illustrates an example of data read processing executed by the storage server SSVp illustrated in FIG. 4. The storage server SSVp executes a data-read control program to thereby realize the processing illustrated in FIG. 16.

First, in step S212, by referring to the device table DTBL illustrated in FIG. 8, the storage server SSVp obtains a mount point corresponding to the device ID received from the front-end server FESV. Next, in step S214, the storage server SSVp makes read access to the magnetic disk device P corresponding to the obtained mount point to read the data therefrom.

Next, in step S216, the storage server SSVp determines whether or not the data reading has succeeded. When the data reading has succeeded, the process proceeds to step S218, and when the data reading has failed, the process proceeds to step S220.

When the data reading has succeeded, in step S218, the storage server SSVp transmits the data, read from the magnetic disk device P, to the front-end server FESV and then ends the read processing. When the data reading has failed, in step S220, the storage server SSVp transmits a read-failure notification indicating that the data reading has failed to the front-end server FESV, and then ends the reading processing.

Figure 17:
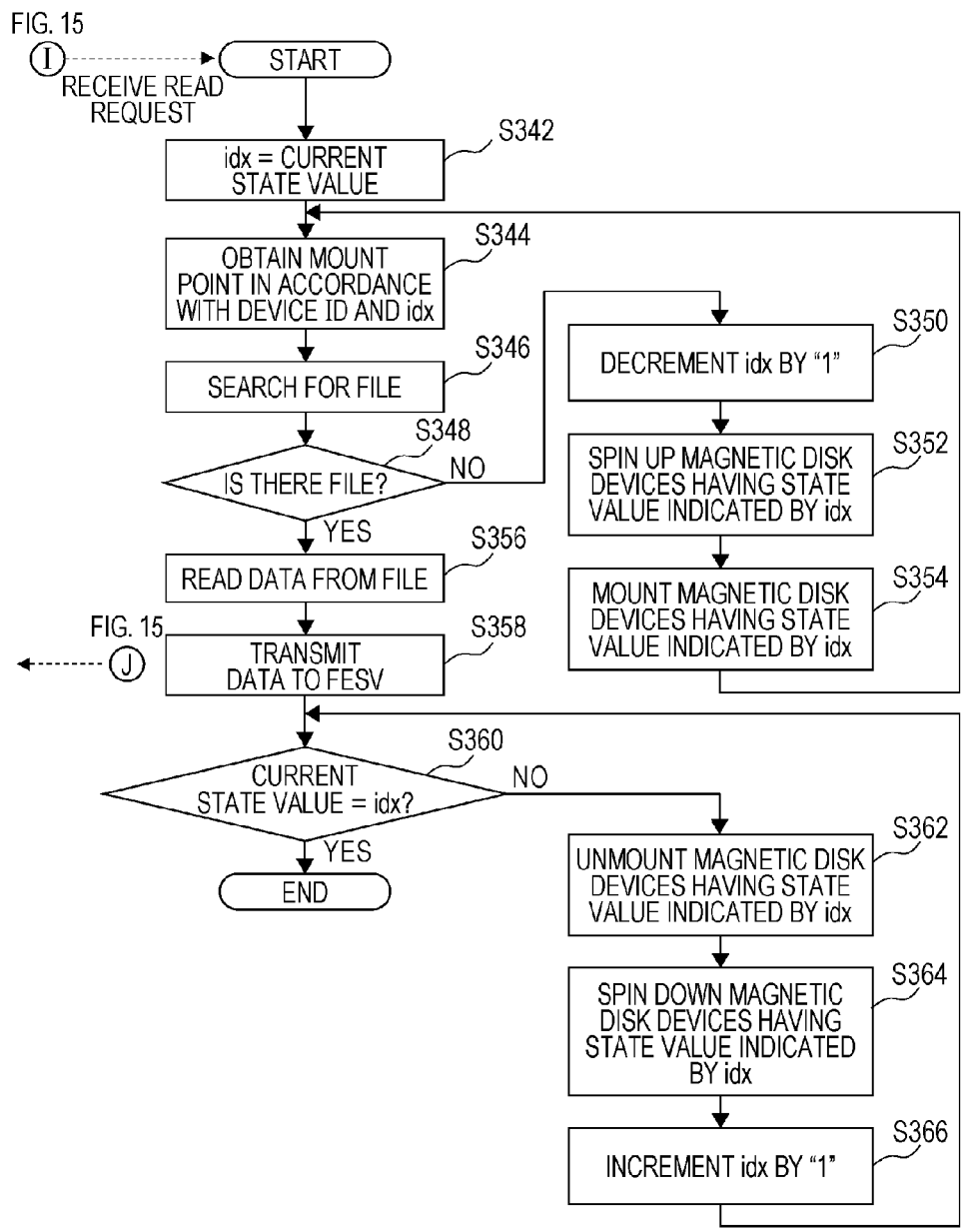
FIG. 17 illustrates an example of data read processing executed by some of the storage servers illustrated in FIG. 4.

FIG. 17 illustrates an example of data read processing executed by the storage servers SSVa, SSVb, and SSVc illustrated in FIG. 4. The storage servers SSVa, SSVb, and SSVc execute the respective data-read control programs independently from each other to thereby realize the processing illustrated in FIG. 17. The description in this example is given of an example in which the front-end server FESV transmits the read request to the storage server SSVa in step S164 illustrated in FIG. 15 and the storage server SSVa reads the data from the magnetic disk device A.

First, in step S342, the storage server SSVa sets a variable idx to a state value indicating the current state. Next, in step S344, by using the device table DTBL illustrated in FIG. 8 and in accordance with the device ID received from the front-end server FESV and the current state value, the storage server SSVa obtains a mount point.

Next, in step S346, the storage server SSVa searches for a file indicated by the full-bit hash value received from the front-end server FESV. Next, in step S348, the storage server SSVa determines whether or not there is the file indicated by the hash value. When there is the file indicated by the hash value, the process proceeds to step S356 in which the data is read from the magnetic disk device A assigned to the current state. When there is no file indicated by the hash value, the process proceeds to step S350 in which the storage server SSVa searches files held in the magnetic disk devices A to which data exceeding the predetermined amount has been written and that has been spun down.

In step S350, the storage server SSVa decrements the variable idx by "1". For example, when the state is state ST1 (idx=1) illustrated in FIG. 7, the storage server SSVa sets, as the magnetic disk devices from which data is to be read, the magnetic disk devices A0 to A3 to which data exceeding the predetermined amount has been written and that are in state ST0.

Next, in step S352, the storage server SSVa puts the magnetic disk devices A having the state value (for example, ST0) indicated by the variable idx into the spin-up state. Next, in step S354, the storage server SSVa mounts the magnetic disk devices (for example, A0 to A3) having the state value indicated by the variable idx. The process then returns to step S344, and a file held in the newly mounted magnetic disk devices A is searched for.

In step S356, the storage server SSVa reads the data from the file indicated by the hash value. Next, in step S358, the storage server SSVa transmits the data, read from the magnetic disk device A, to the front-end server FESV.

Next, in step S360, the storage server SSVa determines whether or not the state value indicating the current state is equal to the variable idx. When the state value is equal to the variable idx, any magnetic disk devices A put into the spin-up state, except for the magnetic disk devices A assigned to the current state, do not exist, and thus the read processing ends. When the state value is different from the variable idx, the magnetic disk devices A put into the spin-up state, other than the magnetic disk devices A assigned to the current state, exist, the process proceeds to step S362.

In step S362, the storage server SSVa unmounts the magnetic disk devices (for example, A0 to A3) having the state value indicated by the variable idx. Next, in step S364, the storage server SSVa puts the magnetic disk devices A having the state value (for example, ST0) indicated by the variable idx into the spin-down state.

Next, in step S366, the storage server SSVa increments the variable idx by "1", and the process returns to step S360. As a result of repetition of the execution of steps S360, S362, S364, and S366, the magnetic disk devices A put into the spin-up state, except for the magnetic disk devices A assigned to the current state, are put into the spin-down state.

In the embodiment illustrated in FIGS. 4 to 17, the magnetic disk devices A, B, and C other than those in the current state may also be put into the spin-down state, as in the embodiment described with reference to FIGS. 1 to 3. Such an arrangement makes it possible to reduce the power consumption of the information processing system SYS2, compared with that in the related art. In this case, since the data reading is executed by the storage server SSVp, it is possible to reduce the power consumption of the information processing system SYS2 without a reduction in the access performance. Since data is redundantly written to the plurality of storage servers SSVp, SSVa, SSVb, and SSVc, it is possible to reduce the power consumption of the information processing system SYS2 while maintaining the data redundancy.

In addition, allocating the magnetic disk devices A (B, or C) in states ST0 to ST2 to each hash space makes it possible to determine the magnetic disk devices A to which data is to be written, without changing the hash function, even when the state ST is changed. Accordingly, it is possible to facilitate data write control executed by the front-end server FESV, compared with a case in which the hash function is changed each time the state ST is changed.

Figure 18:
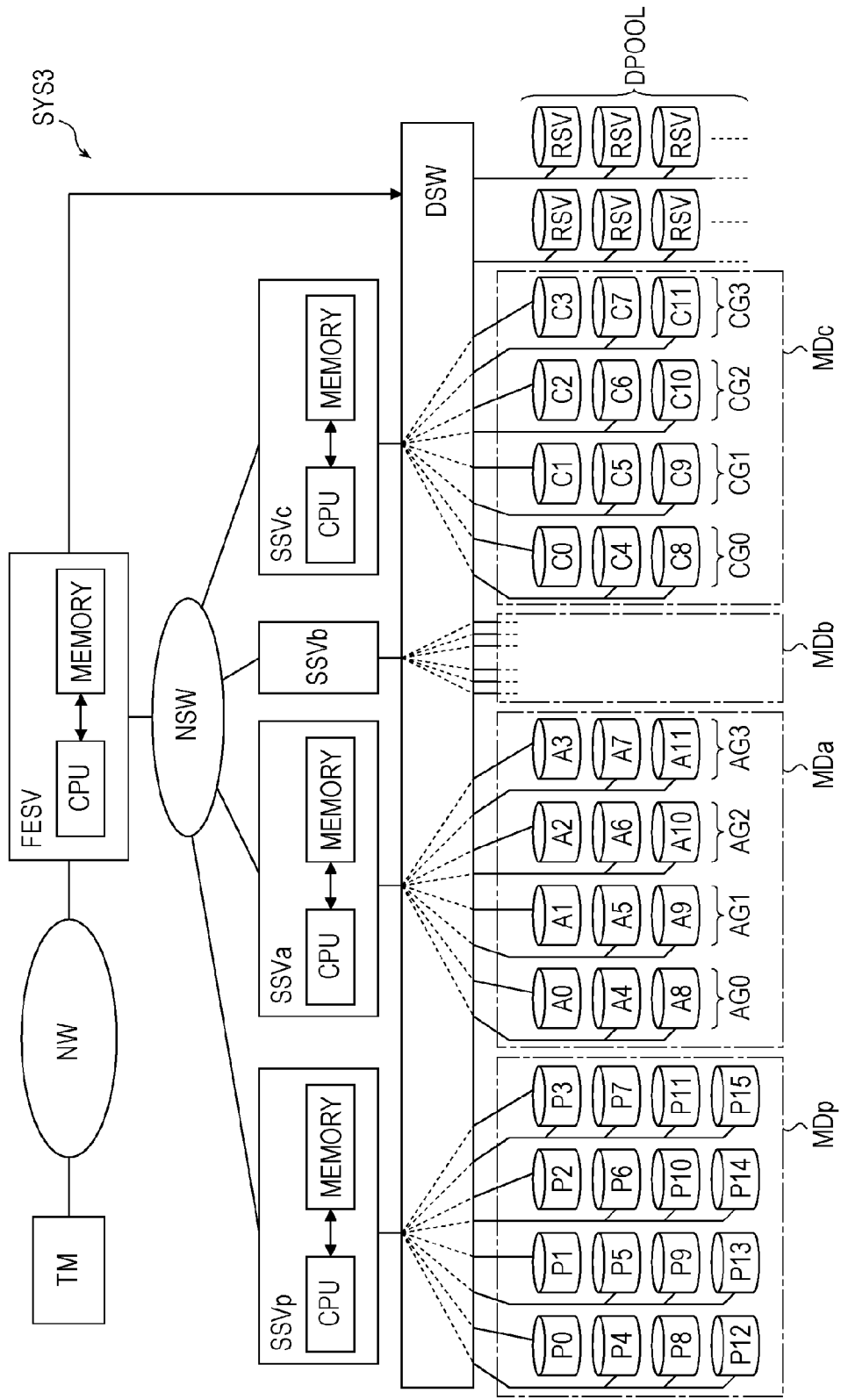
FIG. 18 illustrates another embodiment of the information processing system, the control program for the management apparatus, and the control method for the information processing system.

FIG. 18 illustrates another embodiment of the information processing system, the control program for the management apparatus, and the control method for the information processing system. Elements that are the same as or similar to those described in the embodiment illustrated in FIGS. 4 to 17 are denoted by the same reference numerals, and detailed descriptions thereof are not given hereinafter.

An information processing system SYS3 according to this embodiment includes a switch DSW that connects magnetic-disk-device groups MDp, MDa, MDb, and MDc to storage servers SSVp, SSVa, SSVb, and SSVc. The switch DSW is an example of a switch device that connects magnetic disk devices P0 to P15 to the storage server SSVp and that connects magnetic disk devices A0 to A3 and A4 to A11 to the storage server SSVa, based on connection information managed by a front-end server FESV, which serves as a management apparatus. The information processing system SYS3 further includes a plurality of backup magnetic disk devices RSV coupled to the switch DSW. For example, the magnetic disk devices P, A, B, and C in the magnetic-disk-device groups MDp, MDa, MDb, and MDc and the backup magnetic disk devices RSV are arranged in a disk pool DPOOL. Other elements in the information processing system SYS3 are substantially the same as those illustrated in FIG. 4. The information processing system SYS3 may also include a plurality of storage servers SSVp and a plurality of magnetic-disk-device groups MDp coupled to the plurality of storage servers SSVp.

Under the control of the front-end server FESV, the switch DSW connects the magnetic disk devices in the disk pool DPOOL to the corresponding storage servers SSVp, SSVa, SSVb, and SSVc. Under the control of the front-end server FESV, the switch DSW may also connect the backup magnetic disk devices RSV to the storage servers SSVp, SSVa, SSVb, and SSVc. For example, the backup magnetic disk devices RSV are maintained in the spin-down state.

In this example, the front-end server FESV connects arbitrary magnetic disk devices P in the disk pool DPOOL to the storage server SSVp via the switch DSW. The front-end server FESV connects arbitrary magnetic disk devices A in the disk pool DPOOL to the storage server SSVa via the switch DSW. The front-end server FESV connects arbitrary magnetic disk devices B in the disk pool DPOOL to the storage server SSVb via the switch DSW. The front-end server FESV connects arbitrary magnetic disk devices C in the disk pool DPOOL to the storage server SSVc via the switch DSW. The information processing system SYS3 is constructed to include a configuration similar to that illustrated in FIG. 4, in an initial state in which it starts operation as a network storage.

Figure 19:
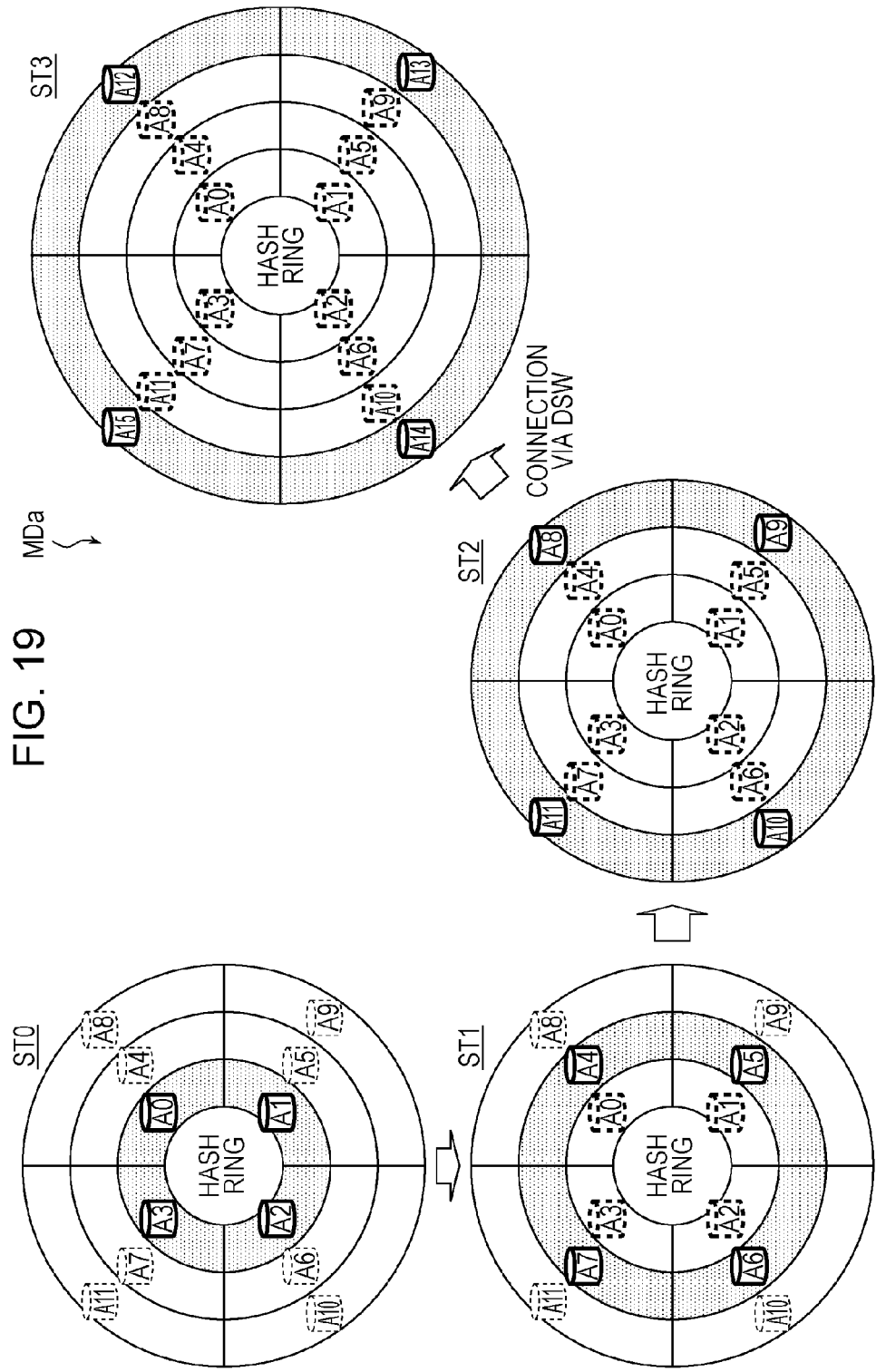
FIG. 19 illustrates an example of changes in states in a hash ring of one of the magnetic-disk-device groups illustrated in FIG. 18.

FIG. 19 illustrates an example of changes in the states in the hash ring of the magnetic-disk-device group MDa illustrated in FIG. 18. Detailed descriptions of elements that are the same as or similar to those in FIG. 7 are not given hereinafter. Changes in states ST0, ST1, and ST2 in the hash ring are substantially the same as those illustrated in FIG. 7. As in FIG. 7, changes in states ST0, ST1, ST2, and ST3 of the magnetic-disk-device group MDb, MDc are represented by replacing the code A of the magnetic disk devices illustrated in FIG. 19 with code B or code C.

In this embodiment, when data exceeding a predetermined amount is written to any of the magnetic disk devices A, B, and C included in the magnetic-disk-device groups MDa, MDb, and MDc and assigned to state ST2, state ST3 is newly provided. In state ST3, the backup magnetic disk devices RSV illustrated in FIG. 18 are connected to the storage servers SSVa, SSVb, and SSVc via the switch DSW.

In steps S306 and S308 illustrated in FIG. 14, any of the storage servers SSVa, SSVb, and SSVc transmits, to the front-end server FESV, information indicating that the free space on any of the magnetic disk devices A, B, and C assigned to state ST2 is insufficient. The front-end server FESV updates the device table DTBL and transmits, to the storage servers SSVa, SSVb, and SSVc, a state change request for changing the state from state ST2 to state ST3.

FIG. 20 illustrates an example of the device table DTBL including state ST3, and FIG. 21 illustrates an example of processing, executed by the front-end server FESV, for changing the state from state ST2 to state ST3. An example of processing for changing the state from state ST2 to state ST3, the processing being executed by the storage servers SSVa, SSVb, and SSVc, is substantially the same as steps S322 to S332 illustrated in FIG. 14.

When data exceeding the predetermined amount has been written to any of the magnetic disk devices A, B, and C assigned to state ST3 state, ST4 may be further provided. In this case, the backup magnetic disk devices RSV are used to connect the magnetic disk devices A, B, and C used in state ST4 to the storage servers SSVa, SSVb, and SSVc via the switch DSW.

FIG. 20 illustrates an example of the device table DTBL to which information including state ST3 illustrated in FIG. 19 has been added. An example of the device table DTBL before the information including state ST3 is added thereto is substantially the same as the device table DTBL illustrated in FIG. 8.

Upon receiving, from any of the storage servers SSVa, SSVb, and SSVc, a notification for changing the state from state ST2 to state ST3, the front-end server FESV adds information for state ST3 to the magnetic-disk-device groups MDa, MDb, and MDc. For example, the front-end server FESV adds, for each device ID, information (the identifier, the mount point, and the IP address) of the magnetic disk devices A, B, and C assigned to state ST3. The device table DTBL including the state ST3 information added by the front-end server FESV is distributed from the front-end server FESV to the storage servers SSVp, SSVa, SSVb, and SSVc.

FIG. 21 illustrates an example of processing, performed by the front-end server FESV, for changing the state from state ST2 to state ST3. Detailed descriptions of operations that are substantially the same as those illustrated in FIG. 12 are not given hereinafter. In this example, steps S114, S116, and S118 are further provided before step S120 in FIG. 12. Other processes are substantially the same as those illustrated in FIG. 12.

When the front-end server FESV receives a state change notification from any of the storage servers SSVa, SSVb, and SSVc, the process proceeds to step S114 in which the front-end server FESV determines whether or not a new state (for example, ST3) is to be added. When a new state is to be added, the process proceeds to step S116. When no new state is to be added, it is determined that the change is a change from state ST0 to state ST1 or is a change from state ST1 to state ST2, and the process proceeds to step S120.

In step S116, the front-end server FESV updates the device table DTBL from the state illustrated in FIG. 8 to the state illustrated in FIG. 20 and reports the updated device table DTBL to the storage servers SSVp, SSVa, SSVb, and SSVc.

Next, in step S118, the front-end server FESV controls the switch DSW to connect the backup magnetic disk devices RSV to the storage servers SSVa, SSVb, and SSVc. For example, the backup magnetic disk devices RSV coupled to the storage server SSVa are used as the magnetic disk devices A12, A13, A14, and A15 illustrated in FIG. 19. Thereafter, the front-end server FESV executes processes in steps S120 and S122, as in FIG. 12.

When a new state is to be added, the storage servers SSVa, SSVb, and SSVc that receive the state change request transmitted in the process in step S120 execute the processes in steps S322 to S332 illustrated in FIG. 14. In steps S322 to S332, the magnetic disk devices A, B, and C corresponding to state ST2 are unmounted and spun down. The storage servers SSVa, SSVb, and SSVc then refer to the updated device table DTBL to spin up and mount the magnetic disk devices A, B, and C corresponding to state ST3.

The data write processing in states ST0 to ST3 is analogous to that illustrated in FIGS. 12, 13, and 14, and the read processing in states ST0 to ST3 is analogous to that illustrated in FIGS. 15, 16, and 17.

The backup magnetic disk devices RSV may also be used as the magnetic disk devices A4 to A11 in the magnetic-disk-device group MDa illustrated in FIG. 18. The backup magnetic disk devices RSV may also be used as the magnetic disk devices B4 to B11 in the magnetic-disk-device group MDb and the magnetic disk devices C4 to C11 in the magnetic-disk-device group MDc. In such a case, when the state is changed from state ST0 to state ST1 and when the state is changed from state ST1 to state ST2, the front-end server FESV controls the switch DSW to connect the magnetic disk devices RSV as the magnetic disk devices A, B, and C.

In the embodiment illustrated in FIGS. 18 to 21, it is also possible to reduce the power consumption of the information processing system SYS3, compared with that in the related art, as in the embodiment illustrated in FIGS. 1 to 3. Also, even when the state ST is to be changed, it is possible to determine the magnetic disk devices A to which data is to be written, without changing the hash function, as in the embodiment illustrated in FIGS. 4 to 17.

In addition, in the embodiment illustrated in FIGS. 18 to 21, the backup magnetic disk devices RSV may be connected to the magnetic-disk-device groups MDa, MDb, and MDc via the switch DSW, which is controlled by the front-end server FESV. With this arrangement, it is possible to add a new state ST3, as illustrated in FIG. 19, and it is also possible to reduce the power consumption of the information processing system SYS3, while alleviating a limitation of the capacity of holding data.

Figure 24:
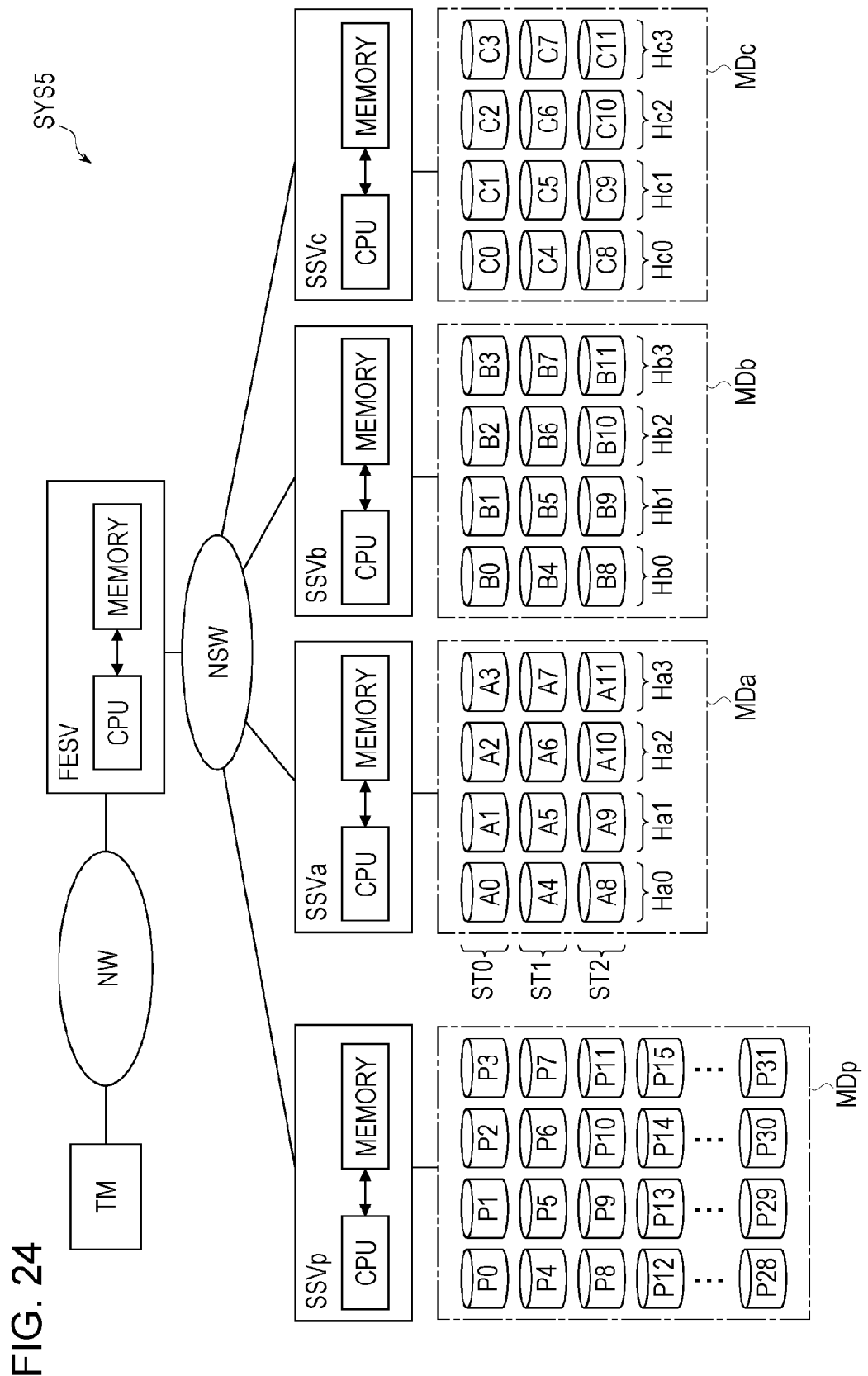
FIG. 24 illustrates another embodiment of the information processing system, the control program for the management apparatus, and the control method for the information processing system.

The switch DSW illustrated in FIG. 18 may also be applied to the information processing system SYS1 illustrated in FIG. 1, an information processing system SYS4 illustrated in FIG. 22, and an information processing system SYS5 illustrated in FIG. 24.

FIG. 22 illustrates another embodiment of the information processing system, the control program for the management apparatus, and the control method for the information processing system. Elements that are the same as or similar to those described in the embodiment illustrated in FIGS. 4 to 17 are denoted by the same reference numerals, and detailed descriptions thereof are not given hereinafter.

The information processing system SYS4 according to this embodiment includes a configuration in which the storage server SSVp is omitted from the information processing system SYS2 illustrated in FIG. 4. Other elements in the information processing system SYS4 are substantially the same as those illustrated in FIG. 4. Since the information processing system SYS4 lacks the storage server SSVp, the device table DTBL includes a structure in which the information about the magnetic-disk-device group MDp is deleted from FIG. 8, and the hash table HTBL includes a structure in which the information about the magnetic-disk-device group MDp is deleted from FIG. 9.

Figure 23:
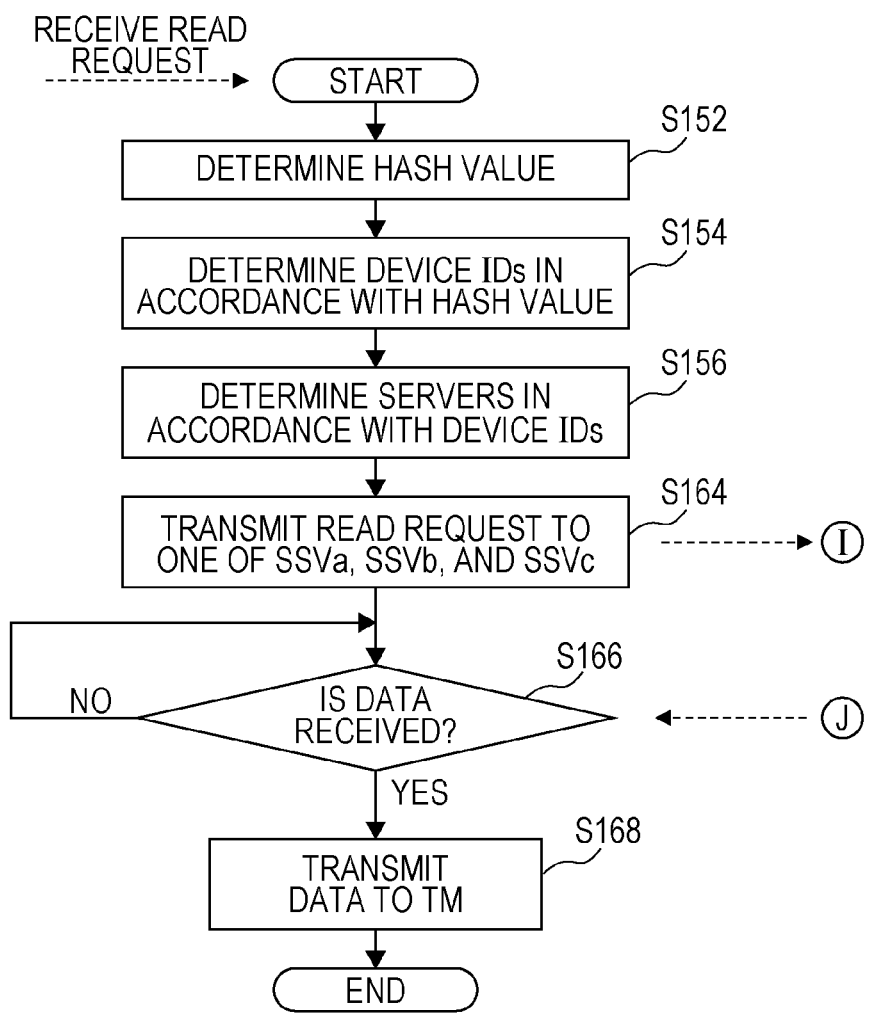
FIG. 23 illustrates an example of data read processing executed by the front-end server illustrated in FIG. 22.

FIG. 23 illustrates an example of read processing executed by the front-end server FESV illustrated in FIG. 22. Detailed descriptions of processes that are the same as or similar to those in FIG. 15 are not given hereinafter. The front-end server FESV executes the network-storage control program to thereby realize the processing illustrated in FIG. 23. That is, FIG. 23 illustrates an example of the operation of the control program and an example of the control method for the information processing system SYS2.

Since the information processing system SYS4 illustrated in FIG. 22 lacks the storage server SSVp, the processing illustrated in FIG. 23 does not include the processes (steps S158, S160, and S162 in FIG. 15) for the storage server SSVp. Steps S152, S154, S156, S164, S166, and S168 are substantially the same as those illustrated in FIG. 15.

Data write processing is also analogous to that illustrated in FIGS. 12 and 14, except that no data is written to the storage server SSVp. Read processing executed by the storage servers SSVa, SSVb, and SSVc is analogous to that illustrated in FIG. 17.

In the embodiment illustrated in FIGS. 22 and 23, it is also possible to reduce the power consumption of the information processing system SYS3, without a reduction in the access performance, as in the embodiment illustrated in FIGS. 1 to 3. Also, even when the state ST is to be changed, it is possible to determine the magnetic disk devices A to which data is to be written, without changing the hash function, as in the embodiment illustrated in FIGS. 4 to 17.

In addition, in the embodiment illustrated in FIGS. 22 and 23, the magnetic disk devices A, B, and C, except for a predetermined number of magnetic disk devices A, B, and C, in the magnetic-disk-device groups MDa, MDb, and MDc are put into the spin-down state. Thus, compared with the information processing system SYS2 (FIG. 4) including the magnetic-disk-device group MDp in which all of the magnetic disk devices P maintain the spin-up state, it is possible to reduce the power consumption of the information processing system SYS4.

For example, in the embodiment illustrated in FIGS. 22 and 23, when data is read from the magnetic disk devices A, B, and C maintained in the spin-up state, it is possible to reduce the frequency of spin up and spin down, and it is also possible to read data at high speed. Thus, it is preferable that the embodiment illustrated in FIGS. 22 and 23 be applied to the information processing system SYS4 in which data reading is concentrated, after data is written to the magnetic disk devices A, B, and C. Alternatively, it is preferable that the embodiment illustrated in FIGS. 22 and 23 be applied to the information processing system SYS4 in which the frequency of read requests is lower than the frequency of write requests.

FIG. 24 illustrates another embodiment of the information processing system, the control program for the management apparatus, and the control method for the information processing system. Elements that are the same as or similar to those described in the embodiment illustrated in FIGS. 4 to 17 are denoted by the same reference numerals, and detailed descriptions thereof are not given hereinafter.

In the information processing system SYS5 according to this embodiment, the magnetic-disk-device group MDp coupled to the storage server SSVp includes a larger number of magnetic disk devices P than those in the magnetic-disk-device group MDp illustrated in FIG. 4. For example, the magnetic-disk-device group MDp includes, but is not particularly limited to, 32 magnetic disk devices P0 to P31. Other elements in the information processing system SYS5 are substantially the same as those illustrated in FIG. 4.

For example, the front-end server FESV redundantly writes data to two different magnetic disk devices P (for example, P0 and P6) in the magnetic-disk-device group MDp via the storage server SSVp. The front-end server FESV does not write the data to the magnetic-disk-device groups MDa, MDb, and MDc. The storage server SSVp executes writing of data to the magnetic-disk-device groups MDa, MDb, and MDc.

The storage server SSVp transfers, at a predetermined frequency, data from one of the two magnetic disk devices P, to which data has been redundantly written, to the magnetic disk devices A, B, and C in the magnetic-disk-device groups MDa, MDb, and MDc. After transferring the data to the magnetic-disk-device groups MDa, MDb, and MDc, the storage server SSVp deletes the data stored in one of the two magnetic disk devices P.

Figure 28:
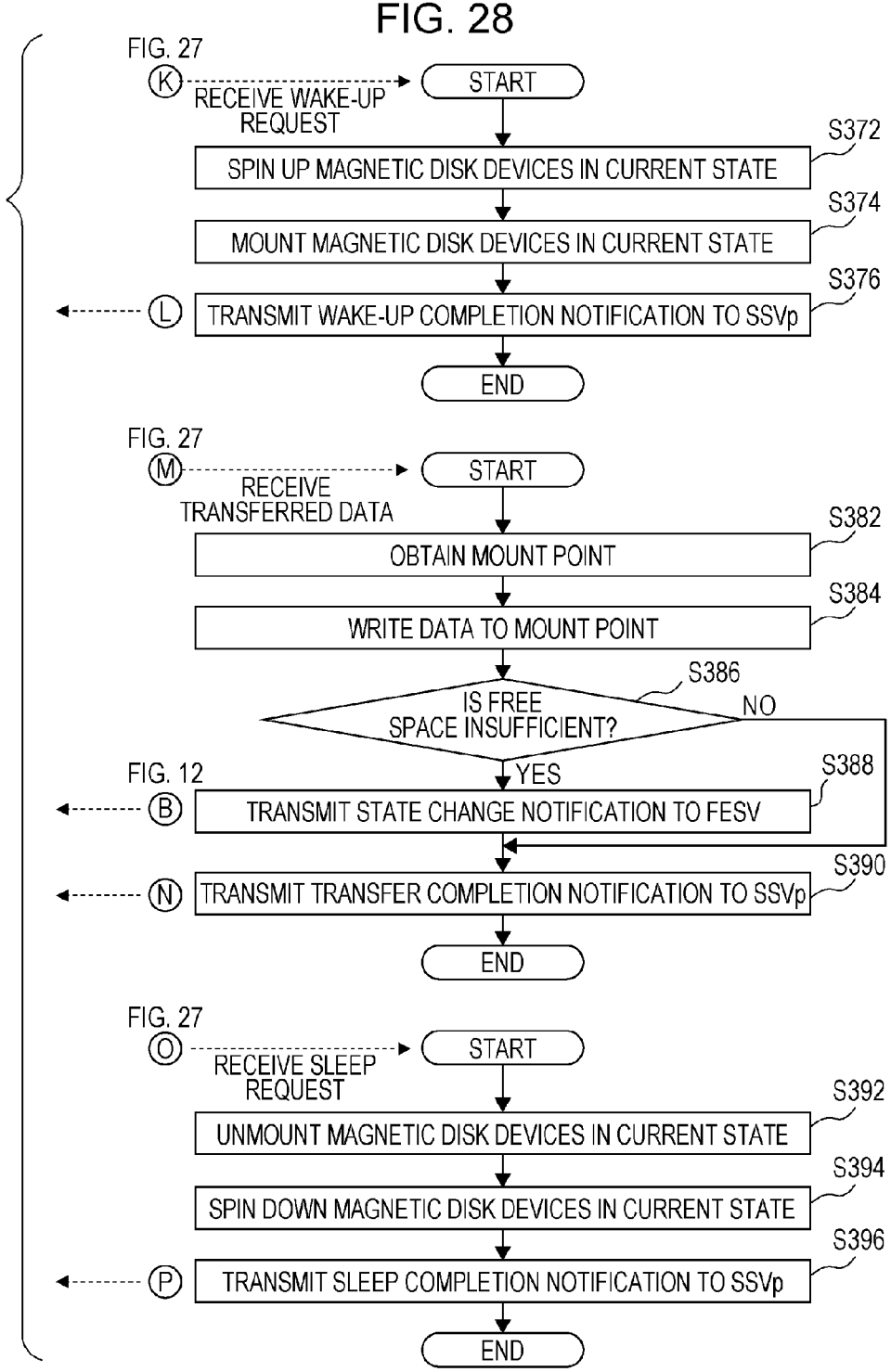
FIG. 28 illustrates an example of transferred-data write processing executed by some of the storage servers illustrated in FIG. 24.

Also, the magnetic disk devices A, B, and C in the magnetic-disk-device groups MDa, MDb, and MDc are put into the spin-up state, in a period in which the data is transferred from the storage server SSVp, and are put into the spin-down state, in a period in which no data is transferred. This makes it possible to reduce the power consumed by the magnetic-disk-device groups MDa, MDb, and MDc, compared with the power consumed by the magnetic-disk-device groups MDa, MDb, and MDc illustrated in FIG. 4. FIG. 27 illustrates an example of data transfer processing executed by the storage server SSVp, and FIG. 28 illustrates an example of transferred-data reception processing executed by the storage servers SSVa, SSVb, and SSVc.

FIG. 25 illustrates an example of a device table DTBL indicating associations of the magnetic disk devices P, A, B, and C coupled to the storage servers SSVp, SSVa, SSVb, and SSVc illustrated in FIG. 24. Detailed descriptions of elements that are the same as or similar to those in FIG. 8 are not given hereinafter. The device table DTBL illustrated in FIG. 25 is the same as that illustrated in FIG. 8, except that the number of magnetic disk devices P (that is, the device IDs) included in the magnetic-disk-device group MDp is larger than the number of magnetic disk devices P in FIG. 8.

FIG. 26 illustrates an example of a hash table HTBL indicating relationships between hash values and the magnetic disk devices P, A, B, and C in the magnetic-disk-device groups MDp, MDa, MDb, and MDc illustrated in FIG. 24. Detailed descriptions of elements that are the same as or similar to those in FIG. 9 are not given hereinafter.

In the hash table HTBL, the relationships between the magnetic-disk-device groups MDa, MDb, and MDc and the hash values are analogous to those illustrated in FIG. 9. That is, the destination to which data is to be written in the magnetic-disk-device group MDa is determined to be one of the four device IDs (devHa0, devHa1, devHa2, and devHa3), in accordance with the top 2 bits of a hash value. Similarly, the destination to which data is to be written in each of the magnetic-disk-device groups MDb and MDc is determined to be one of the four device IDs, in accordance with the top 2 bits of the hash value.

The magnetic-disk-device group MDp is further divided into two magnetic-disk-device groups MDp1 and MDp2, and two devices ID (for example, devP0 and devP6) are assigned to each of 32 hash values. The device IDs assigned to the magnetic-disk-device groups MDp1 and MDp2 overlap each other. For example, device ID "devP0" is assigned to a hash value "00h" for the magnetic-disk-device group MDp1 and a hash value "1Eh" for the magnetic-disk-device group MDp2. However, the device IDs of the magnetic-disk-device groups MDp1 and MDp2 assigned to each hash value are different from each other.

For example, the front-end server FESV writes data to two of the 32 magnetic disk devices P0 to P31, in accordance with the top 5 bits (00h-1Fh) of a 128-bit hash value. The hash value may also be obtained by inputting "/foo/bar/buz" in a URI to a hash function, as described above with reference to FIG. 12.

An example of data write processing executed by the front-end server FESV is analogous to that in FIG. 12, except for the process in step S108 illustrated in FIG. 12. In step S108 in this embodiment, the front-end server FESV transmits a write request to the storage server SSVp and does not transmit a write request to the storage servers SSVa, SSVb, and SSVc. An example of data write processing executed by the storage server SSVp is analogous to that in FIG. 13.

FIG. 27 illustrates an example of data transfer processing executed by the storage server SSVp illustrated in FIG. 24. The storage server SSVp executes a data-transfer control program to thereby realize the processing illustrated in FIG. 27. The storage server SSVp executes the data transfer processing illustrated in FIG. 27, each time a predetermined time (for example, 12:00 a.m. every day) is reached. Before the data transfer processing illustrated in FIG. 27 is started, the magnetic disk devices A, B, and C in the magnetic-disk-device groups MDa, MDb, and MDc are maintained in the spin-down state.

When the predetermined time is reached, in step S262, the storage server SSVp transmits, to the storage servers SSVa, SSVb, and SSVc, a wake-up request for waking up the magnetic disk devices A, B, and C assigned to the current state. FIG. 28 illustrates an example of wake-up processing that the storage servers SSVa, SSVb, and SSVc execute in response to the wake-up request.

In step S264, the storage server SSVp waits to receive a wake-up completion notification indicating that the wake-up processing has been completed from each of the storage servers SSVa, SSVb, and SSVc. When the storage server SSVp receives a wake-up completion notification from each of the storage servers SSVa, SSVb, and SSVc, the process proceeds to step S266.

In step S266, the storage server SSVp selects, for example, one of the hash values (top bits) from the hash table HTBL illustrated in FIG. 26 and selects, in the magnetic-disk-device group MDp2, the magnetic disk device P assigned to the selected hash value. For example, for a hash value "00h", the magnetic disk device P6 assigned to the device ID (devP6) is selected.

Next, in step S268, the storage server SSVp searches for a file that is held in the selected magnetic disk device P and that is to be transferred. As in the data write processing illustrated in FIG. 13, data is written to the magnetic disk device P by using the full-bit hash value as the file name. Thus, by searching for a file name whose top 5 bits are "00h", the storage server SSVp may find the file to be transferred.

Next, in step S270, the storage server SSVp determines whether or not there is the file to be transferred. When there is the file to be transferred, the process proceeds to step S272, and when there is no file to be transferred, the process proceeds to step S282.

In step S272, the storage server SSVp searches the hash table HTBL illustrated in FIG. 26 to determine the device IDs of the magnetic-disk-device groups MDa, MDb, and MDc to which the top 2 bits of the selected hash value is assigned. For example, when the selected hash value is "00h", "devHa0", "devHb0", and "devHc0" are determined as the device IDs. For example, when the selected hash value is "1Ah", "devHa2", "devHb2", and "devHc2" are determined as the device IDs.

Next, in step S274, the storage server SSVp searches the device table DTBL illustrated in FIG. 25 to determine IP addresses associated with the device IDs determined in step S272. That is, in accordance with the device IDs, the storage server SSVp determines the storage servers SSVa, SSVb, and SSVc to which the data is to be transferred.

Next, in step S276, the storage server SSVp transmits, to each of the determined IP addresses, the data to be transferred, the device ID of the magnetic disk device to which the data is to be transferred, and the file name (full-bit hash value). That is, the storage server SSVp outputs a data transfer request to each of the storage servers SSVa, SSVb, and SSVc. FIG. 28 illustrates an example of the operation of each of the storage servers SSVa, SSVb, and SSVc that receive the transfer request.

In step S278, the storage server SSVp waits for receiving a transfer completion notification indicating that the data transfer has been completed from each of the storage servers SSVa, SSVb, and SSVc. When the storage server SSVp receives the transfer completion notification from each of the storage servers SSVa, SSVb, and SSVc, the process proceeds to step S280.

In step S280, the storage server SSVp deletes the transferred file from files (that is, data) held in the magnetic disk device P to which the selected device ID is assigned in the magnetic-disk-device group MDp2. After step S280, the process proceeds to step S282.

In step S282, by referring to the hash table HTBL illustrated in FIG. 26, the storage server SSVp determines whether or not all of the device IDs assigned to the magnetic-disk-device group MDp2 have been selected. That is, the storage server SSVp determines whether or not the data held in the magnetic disk device P allocated to the magnetic-disk-device group MDp2 has been transferred to the storage servers SSVa, SSVb, and SSVc. When all of the device IDs assigned to the magnetic-disk-device group MDp2 have been selected, the process proceeds to step S284. When there is any unselected device ID assigned to the magnetic-disk-device group MDp2, the process returns to step S266, and the data held in the magnetic disk device P assigned to the unselected device ID is transferred to the storage servers SSVa, SSVb, and SSVc.

In step S284, the storage server SSVp transmits, to the storage servers SSVa, SSVb, and SSVc, a sleep request for putting the magnetic disk devices A, B, and C assigned to the current state (any of ST0, ST1, and ST2) to sleep. FIG. 28 illustrates an example of sleep processing that the storage servers SSVa, SSVb, and SSVc execute in response to the sleep request.

In step S286, the storage server SSVp waits for receiving a sleep completion notification indicating that the sleep processing has been completed from each of the storage servers SSVa, SSVb, and SSVc. When the storage server SSVp receives the sleep completion notification from each of the storage servers SSVa, SSVb, and SSVc, the data transfer processing executed by the storage server SSVp ends.

FIG. 28 illustrates an example of transferred-data write processing executed by the storage servers SSVa, SSVb, and SSVc illustrated in FIG. 24. The storage servers SSVa, SSVb, and SSVc execute the respective data-transfer control programs independently from each other to thereby realize the processing illustrated in FIG. 28. A description in this example will be given of an example of data transfer processing executed by the storage server SSVa.

First, when the storage server SSVa receives a wake-up request from the storage server SSVp, in step S372, the storage server SSVa puts the magnetic disk devices A corresponding to the current state into the spin-up state. Next, in step S374, the storage server SSVa mounts the magnetic disk devices A corresponding to the current state.

Next, in step S376, the storage server SSVa transmits, to the storage server SSVp, a wake-up completion notification indicating that the wake-up processing on the magnetic disk devices A corresponding to the current state has been completed, and then ends the wake-up processing.

When transferred data is received from the storage server SSVp, in step S382, the storage server SSVa refers to the device table DTBL illustrated in FIG. 25 to obtain a mount point corresponding to the device ID received from the storage server SSVp and the current state.

Next, in step S384, the storage server SSVa writes the data, received from the storage server SSVp, to the magnetic disk device A mounted at the obtained mount point. In this case, the storage server SSVa writes the data to the magnetic disk device A by using the full-bit hash value as a file name.

Next, in step S386, the storage server SSVa determines whether or not the amount of data held in the magnetic disk device A assigned to the current state has exceeded the predetermined amount as a result of the data writing. That is, a determination is made as to whether or not the free space on the magnetic disk device A has become insufficient. When the free space has become insufficient, the process proceeds to step S388 in order to change the state, and when the free space has not become insufficient, the process proceeds to step S390.

In step S388, the storage server SSVa transmits a state change notification to the front-end server FESV. Upon receiving the state change notification, the front-end server FESV executes the processes in steps S120 and S122 illustrated in FIG. 12. In addition, the storage servers SSVa, SSVb, and SSVc execute the processes in step S322, S324, S326, S328, S330, and S332 illustrated in FIG. 14.

In step S388, the storage server SSVa may transmit a state change notification to the storage server SSVp, and the storage server SSVp may execute the processes in steps S120 and S122 illustrated in FIG. 12. In this case, in step S332 illustrated in FIG. 14, the state-change completion notification is transmitted to the storage server SSVp, not the front-end server FESV.

In step S390, the storage server SSVa transmits a transfer completion notification indicating that the writing of the transferred data has been completed to the storage server SSVp, and ends the transferred-data write processing.

When a sleep request is received from the storage server SSVp, in step S392, the storage server SSVa unmounts the magnetic disk devices A corresponding to the current state. Next, in step S394, the storage server SSVa puts the magnetic disk devices A corresponding to the current state into the spin-down state. Next, in step S396, the storage server SSVa transmits, to the storage server SSVp, a sleep completion notification indicating that the sleep processing on the magnetic disk devices A corresponding to the current state has been completed, and then ends the sleep processing.

Figure 29:
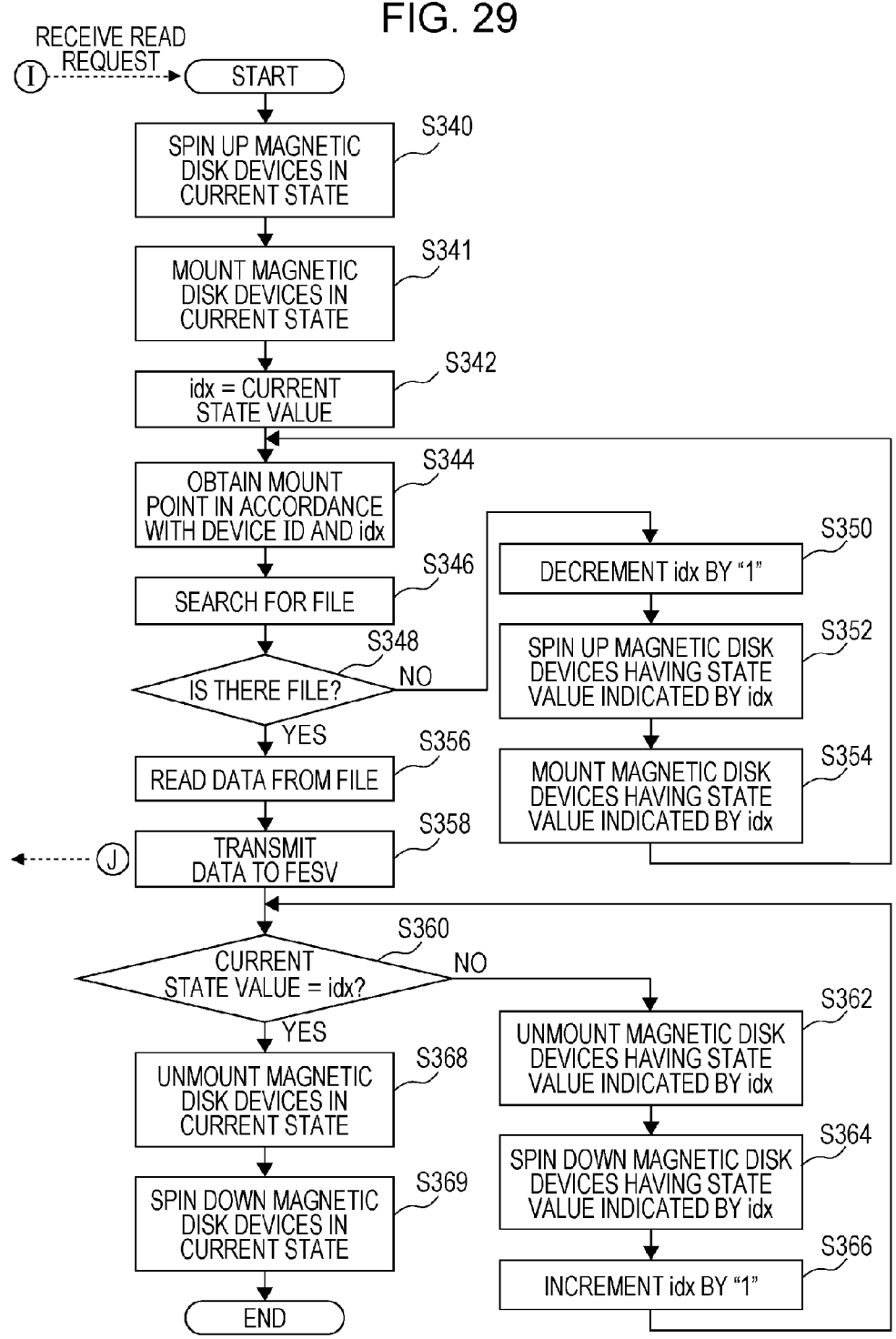
FIG. 29 illustrates an example of data read processing executed by some of the storage servers illustrated in FIG. 24.

FIG. 29 illustrates an example of data read processing executed by the storage servers SSVa, SSVb, and SSVc illustrated in FIG. 24. Detailed descriptions of processes that are the same as or similar to those in FIG. 17 are not given hereinafter. Processes in steps S342 to S366 are analogous to those illustrated in FIG. 17. In FIG. 29, steps S340 and S341 are provided before step S342 illustrated in FIG. 17, and steps S368 and S369 are provided after the affirmative determination (YES) in step S360 illustrated in FIG. 17.

The storage servers SSVa, SSVb, and SSVc execute the respective data-read control programs independently from each other to thereby realize the processing illustrated in FIG. 29. A description in this example will be given of an example in which the storage server SSVa receives a read request.

In step S340, the storage server SSVa puts the magnetic disk devices A corresponding to the current state into the spin-up state. Next, in step S341, the storage server SSVa mounts the magnetic disk devices A corresponding to the current state. Thereafter, the storage server SSVa executes a process in step S342 and the subsequent processes, as in FIG. 17.

When the state value is equal to the variable idx in step S360, it is determined that the magnetic disk devices A put into the spin-up state, except for the magnetic disk devices A assigned to the current state, do not exist, and the process proceeds to step S368.

In step S368, the storage server SSVa unmounts the magnetic disk devices A corresponding to the current state. Next, in step S369, the storage server SSVa puts the magnetic disk devices A corresponding to the current state into the spin-down state, and ends the read processing. As a result, all of the magnetic disk devices A in the magnetic-disk-device group MDa are put into a sleep state (that is, the spin-down state). As a result, the power consumption is reduced compared with a case in which the magnetic disk devices A corresponding to the current state are maintained in the spin-up state.

In the embodiment illustrated in FIGS. 24 to 29, it is also possible to reduce the power consumption of the information processing system SYS5, without a reduction in the access performance, as in the embodiment illustrated in FIGS. 1 to 3. Also, even when the state ST is to be changed, it is possible to determine the magnetic disk devices A to which data is to be written, without changing the hash function, as in the embodiment illustrated in FIGS. 4 to 17.

In addition, in the embodiment illustrated in FIGS. 24 to 29, the magnetic-disk-device groups MDa, MDb, and MDc are put into the spin-down state, in a period in which no data is written. Thus, it is possible to reduce the power consumption of the information processing system SYS5, compared with a case in which a predetermined number of the magnetic disk devices A, B, and C in the magnetic-disk-device groups MDa, MDb, and MDc are put into the spin-up state.

Also, since data transferred to the magnetic disk devices A, B, and C is deleted from the magnetic disk device P, data that has been deleted in the transfer processing is not transferred to the magnetic disk devices A, B, and C in next transfer processing. Accordingly, compared with a case in which data is redundantly transferred to the magnetic disk devices A, B, and C, it is possible to reduce the time taken for the transfer processing, and it is also possible to reduce the load in the transfer processing.

Features and advantages of the embodiments will become apparent from the detailed description above. The present disclosure is intended to encompass such features and advantages of the embodiments without departing from the spirit and the scope of the appended claims. It is also to be noted that a person having ordinary skill in the art may easily conceive various improvements and modifications. The present disclosure, therefore, is not intended to limit the scope of the embodiments having inventiveness and may also be realized with appropriate improvements and equivalents encompassed by the scope disclosed in the embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system comprising:
a first information processing apparatus to which a first magnetic-disk-device group is coupled, the first magnetic-disk-device group including a plurality of first magnetic disk devices, a motor in each of the plurality of first magnetic disk drives being maintained in a state of rotation;
a second information processing apparatus to which a second magnetic-disk-device group is coupled, the second magnetic-disk-device group including one or more second magnetic disk devices and a plurality of third magnetic disk devices, a motor in each of the one or more second magnetic disk devices being maintained in a rotation state, a motor in each of the plurality of third magnetic disk devices being maintained in a stop state; and a management apparatus configured to manage the first information processing apparatus and the second information processing apparatus, wherein, when data is to be written, the management apparatus outputs a write request to any of the plurality of first magnetic disk devices and any of the one or more second magnetic disk devices, and when data is to be read, the management apparatus outputs a read request to any of the plurality of first magnetic disk devices.

2. The information processing system according to claim 1, further comprising wherein, when an amount of data held in any of the one or more second magnetic disk devices exceeds a certain amount, the management apparatus causes the second information processing apparatus to stop rotation of the motor in each of the one or more second magnetic disk devices and to rotate a certain number of motors in the plurality of third magnetic disk devices, and when data is to be further written, the management apparatus outputs a write request to any of the plurality of first magnetic disk devices and any of the certain number of motors in the motors of the plurality of third magnetic disk devices.

3. The information processing system according to claim 2, wherein the second information processing apparatus includes a plurality of the second information processing apparatuses, and when the amount of data held in any of the second magnetic disk devices coupled to the plurality of the second information processing apparatuses exceeds a certain amount, the management apparatus causes each of the plurality of the second information processing apparatuses to stop rotation of the motor in each of the second magnetic disk devices and to rotate the certain number of motors in the third magnetic disk devices.

4. The information processing system according to claim 2, wherein, when no data is readable from the first magnetic disk devices in response to the read request, the management apparatus outputs a read request to any of the second magnetic disk devices or any of the third magnetic disk devices whose motors are rotated, and when data is to be read from the second magnetic disk devices in which the rotation of the motors is stopped, the management apparatus causes the second information processing apparatus to rotate the motors of the second magnetic disk devices and causes the second information processing apparatus to stop the rotation of the motors of the second magnetic disk devices after reading the data from the second magnetic disk devices.

5. The information processing system according to claim 2, further comprising:

a switch device configured to connect the first magnetic disk devices to the first information processing apparatus and connect the one or more second magnetic disk devices and the third magnetic disk devices to the second information processing apparatus, based on connection information managed by the management apparatus; and a plurality of fourth magnetic disk devices coupled to the switch device, wherein, when an amount of data held in any of the third magnetic disk devices whose motors are rotated exceeds a certain amount, the management apparatus causes the second information processing apparatus to stop the rotation of the motors of the third magnetic disk devices, connects the fourth magnetic disk devices to the second information processing apparatus via the switch device, and causes the second information processing apparatus to rotate motors of the fourth magnetic disk devices, and when data is to be further written, the management apparatus outputs a write request to any of the first magnetic disk devices and any of the fourth magnetic disk devices whose motors are rotated.

6. The information processing system according to claim 1, wherein the management apparatus determines the second magnetic disk device to which data is to be written, by using a hash function, the second magnetic disk devices are allocated to a common hash space, and the third magnetic disk devices are allocated to a common hash space.

7. The information processing system according to claim 6, wherein the management apparatus determines to which of the first magnetic disk devices data is to be written, by using the hash function, and the number of hash spaces to which the first magnetic disk devices are allocated is larger than the number of hash spaces to which the second magnetic disk devices are allocated.

8. An information processing system comprising:

a first information processing apparatus to which a first magnetic-disk-device group is coupled, the first magnetic-disk-device group including a plurality of first magnetic disk devices in which rotation states of motors are maintained and a plurality of second magnetic disk devices in which rotation of motors is stopped;

a second information processing apparatus to which a second magnetic-disk-device group is coupled, the second magnetic-disk-device group including a plurality of third magnetic disk devices in which rotation states of motors are maintained and a plurality of fourth magnetic disk devices in which rotation of motors is stopped; and a management apparatus configured to manage the first information processing apparatus and the second information processing apparatus, wherein, when data is to be written, the management apparatus outputs a write request to any of the plurality of first magnetic disk devices that are included in the first magnetic-disk-device group and in which the rotation states of the motors are maintained and any of the plurality of third magnetic disk devices that are included in the second magnetic-disk-device group and in which the rotation states of the motors are maintained, and when data is to be read, the management apparatus outputs a read request to any of the plurality of first magnetic disk devices included in the first magnetic-disk-device group and the third magnetic disk devices included in the second magnetic-disk-device group.

9. The information processing system according to claim 8, wherein, when an amount of data held in any of the first magnetic disk devices and the third magnetic disk devices exceeds a predetermined amount, the management apparatus causes the first information processing apparatus to stop rotation of the motors of the first magnetic disk devices and to rotate a predetermined number of motors of the motors of the second magnetic disk devices and causes the second information processing apparatus to stop rotation of the motors of the third magnetic disk devices and to rotate a predetermined number of motors of the motors of the fourth magnetic disk devices; and when data is to be further written, the management apparatus outputs a write request to any of the second magnetic disk devices whose motors are rotated and any of the fourth magnetic disk devices whose motors are rotated.

10. A control method for an information processing system, wherein the information processing system includes a first information processing apparatus to which a first magnetic-disk-device group is coupled, the first magnetic-disk-device group including a plurality of first magnetic disk devices in which rotation states of motors are maintained; a second information processing apparatus to which a second magnetic-disk-device group is coupled, the second magnetic-disk-device group including a plurality of second magnetic disk devices in which rotation states of motors are maintained and a plurality of third magnetic disk devices in which rotation of motors is stopped; and a management apparatus configured to manage the first information processing apparatus and the second information processing apparatus, the control method comprising:

the management apparatus outputting a write request to any of the plurality of first magnetic disk devices included in the first magnetic-disk-device group and any of the plurality of second magnetic disk devices included in the second magnetic-disk-device group, when data is to be written; and the management apparatus outputting a read request to any of the plurality of first magnetic disk devices included in the first magnetic-disk-device group, when data is to be read.

* * * * *